US010168452B2

(12) United States Patent
Uchida et al.

(10) Patent No.: US 10,168,452 B2
(45) Date of Patent: Jan. 1, 2019

(54) ANTIREFLECTION COATING, OPTICAL ELEMENT, OPTICAL SYSTEM AND OPTICAL APPARATUS

(71) Applicant: CANON KABUSHIKI KAISHA, Tokyo (JP)

(72) Inventors: Kazue Uchida, Utsunomiya (JP); Kazuhiko Momoki, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 15/279,789

(22) Filed: Sep. 29, 2016

(65) Prior Publication Data
US 2017/0108622 A1   Apr. 20, 2017

(30) Foreign Application Priority Data

Oct. 16, 2015 (JP) .................................. 2015-204574

(51) Int. Cl.
*G02B 27/00* (2006.01)
*G02B 1/115* (2015.01)
*G02B 1/118* (2015.01)

(52) U.S. Cl.
CPC .............. *G02B 1/115* (2013.01); *G02B 1/118* (2013.01); *G02B 27/0018* (2013.01)

(58) Field of Classification Search
CPC ............. G02B 1/11–1/16; G02B 1/105; G02B 1/111–1/118; G02B 5/02; G02B 5/23;

(Continued)

(56) References Cited

U.S. PATENT DOCUMENTS

2004/0180138 A1* 9/2004 Nishida .................. G02B 1/115
427/164
2014/0322502 A1* 10/2014 Koyama ................ G02B 1/115
428/212

FOREIGN PATENT DOCUMENTS

JP          2013250295 A     12/2013

OTHER PUBLICATIONS

"Seeing Photons: Progress and Limits of Visible and Infrared Sensor Arrays." Fundamentals of Ultraviolet, Visible, and Infrared Detectors. Committee on Developments in Detector Technologies. National Research Council. 2010:23-26.

(Continued)

*Primary Examiner* — Mustak Choudhury
(74) *Attorney, Agent, or Firm* — Rossi, Kimms & McDowell LLP

(57) ABSTRACT

The antireflection coating is a multi-layer film to be formed on a surface of a substrate. The film includes multiple layers including an uppermost layer most distant from the substrate among the multiple layers, and a lower layer including at least one layer other than the uppermost layer. A refractive index $n_m$ of the uppermost layer for a wavelength of $\lambda$ (nm) satisfies a condition of $1.11 \leq n_m \leq 1.3$. An optical admittance Y of the lower layer is expressed by $Y=a+ib$, and a and b in the optical admittance satisfy conditions of $(a-1.13)^2+(b-0.24)^2 \leq 0.45^2$ for $\lambda=430$, $(a-1.33)^2+(b+0.05)^2 \leq 0.25^2$ for $\lambda=900$ and $(a-1.14)^2+(b+0.25)^2 \leq 0.29^2$ for $\lambda=1800$.

13 Claims, 14 Drawing Sheets

(58) Field of Classification Search
CPC .... G02B 5/282; G02B 5/287; G02B 27/0018;
G02B 27/36; G02B 27/283; B32B 17/06;
B32B 17/10; B32B 17/10018; B32B
17/10036; B32B 17/10174; B32B
17/10201; C03C 17/006; C03C 17/007;
C03C 17/23; C03C 17/30; C03C 17/32;
C03C 17/34; C03C 17/36; C03C 17/42;
C03C 17/52; C03C 17/245; C03C 17/225;
C03C 17/256; C03C 17/328; C03C
17/3417; C03C 17/3452; C03C 17/3615;
C03C 17/3621; C03C 17/3649; C03C
17/3657; C03C 17/3678; C03C 17/3694
USPC ........... 359/601, 359, 356, 580–599; 428/34,
428/430, 212, 332, 426, 141, 421
See application file for complete search history.

(56) References Cited

OTHER PUBLICATIONS

Lee. "Optical thin films and film-forming techniques." Agne Gijutsu Center Inc.(misc pages).

\* cited by examiner

ANTIREFLECTION COATING, OPTICAL ELEMENT, OPTICAL SYSTEM AND OPTICAL APPARATUS

BACKGROUND OF THE INVENTION

Field of the Invention

The present invention relates to an antireflection coating formed by a multi-layer film.

Description of the Related Art

Optical apparatuses such as surveillance cameras include ones required to be capable of not only visible light image capturing, but also near-infrared light image capturing in darkness such as night. Such image capturing in darkness is made possible using airglow radiated due to a chemical reaction and an electromagnetic reaction in the atmosphere. The airglow, which is generated in a wavelength range from a visible range to a near-infrared range, has a peak in a wavelength range from 1450 nm to 1800 nm in the near-infrared range (see "Seeing Photons: Progress and Limits of Visible and Infrared Sensor Arrays" (Committee on Developments in Detector Technologies; National Research Council, 2010) pp. 25).

On the other hand, a surface of a light-transmissive member such as a lens used in an image capturing optical system is provided with, in order to reduce a reflectance thereat, an antireflection coating formed by a multi-layer film in which multiple dielectric thin films formed by evaporation (deposition) are layered. Furthermore, an antireflection coating including an uppermost layer whose material has a lower refractive index than a refractive index of 1.38 of magnesium fluoride used for the evaporated film can provide a higher antireflection performance. As low refractive index materials, inorganic materials such as silica and magnesium fluoride and organic materials such as silicon resin and non-crystalline fluorine resin are known. These materials can reduce their refractive indices by forming voids in their layers.

In the optical apparatuses capable of the visible light image capturing and the near-infrared light image capturing, a reduction of the reflectance of the light-transmissive member such as the lens not only reduces a generation of unwanted light such as flare and ghost, but also increases an amount of transmitted light to obtain more image information.

Japanese Patent Laid-Open No. 2013-250295 discloses an antireflection coating having an antireflection effect from the visible range to the near-infrared range. This antireflection coating has a twelve-layer structure in which high refractive index films and low refractive index films are alternately layered, and its twelfth layer as an uppermost layer is formed of an extremely low refractive index material whose refractive index is in a range from 1.20 to 1.29.

However, the antireflection coating disclosed in Japanese Patent Laid-Open No. 2013-250295 has a reflectance characteristic that its reflectance increases in a wavelength range of 1600 nm or more and that provides a reflectance of 1% or more in a wavelength range near 1700 nm. Since the airglow has its peak in the wavelength from 1450 nm to 1800 nm as described above, a level of an antireflection performance approximately the same as that of the antireflection coating disclosed in Japanese Patent Laid-Open No. 2013-250295 is insufficient for the airglow.

SUMMARY OF THE INVENTION

The present invention provides an antireflection coating having a high antireflection performance in a wide wavelength range from 430 nm to 1800 nm in which not only visible light but also airglow can be used. The present invention further provides an optical element provided with the antireflection coating, an optical system and an optical apparatus.

The present invention provides as an aspect thereof an antireflection coating as a multi-layer film to be formed on a surface of a substrate. The coating includes multiple layers including an uppermost layer most distant from the substrate among the multiple layers, and a lower layer including at least one layer other than the uppermost layer. A refractive index $n_m$ of the uppermost layer for a wavelength of A (nm) satisfies a condition of $1.11 \leq n_m \leq 1.3$. An optical admittance Y of the lower layer is expressed by $Y=a+ib$, and a and b in the optical admittance satisfy conditions of $(a-1.13)^2+(b-0.24)^2 \leq 0.45^2$ for $\lambda=430$, $(a-1.33)^2+(b+0.05)^2 \leq 0.25^2$ for $\lambda=900$ and $(a-1.14)^2+(b+0.25)^2 \leq 0.29^2$ for $\lambda=1800$.

The present invention provides as other aspects thereof an optical element, an optical system and an optical apparatus using the above antireflection coating.

Further features and aspects of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 1:
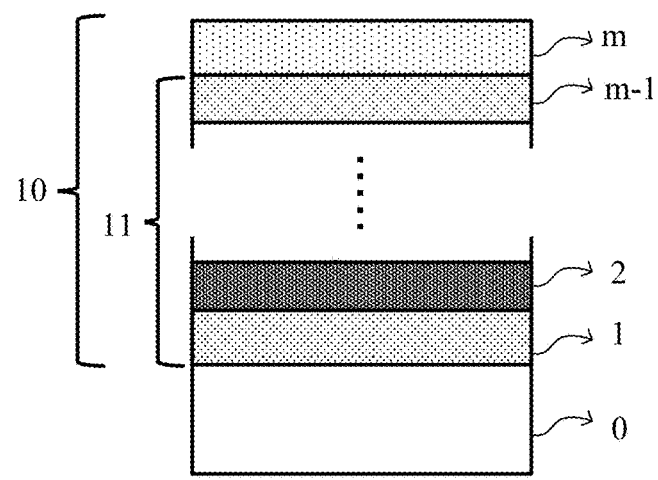
FIG. 1 is a sectional view of an antireflection coating that is a representative embodiment of the present invention.

FIG. 1 illustrates a structure of an antireflection coating (film) 10 formed as a multi-layer film, which is a representative embodiment of the present invention. The antireflection coating 10 is provided on an optical element such as a lens. The antireflection coating 10 is provided on a surface of a substrate 0 that is a body (optical element body such as a lens portion that is a light-transmissive portion) of the optical element. The antireflection coating 10 is a multi-layer film including two or more layers. Specifically, the antireflection coating 10 includes a lower layer 11 and an uppermost layer m; the lower layer 11 includes a first thin layer 1 to an (m−1)-th thin layer m−1, and the uppermost layer m is an m-th layer. The uppermost layer m is a layer most distant from the substrate 0 and is a most-surface-side layer forming a boundary with air. The uppermost layer m has a refractive index from 1.10 to 1.30 for a wavelength $\lambda$ (430≤$\lambda$≤1800) (nm), which is a lower refractive index layer than those of the thin film layers 1 to m−1.

According to the following reference literature, using an optical admittance and a characteristic matrix enables a thin film design in which two boundaries that are one between an entrance medium and a thin film and one between that thin film and a substrate are converted into one boundary expressed by an equivalent optical admittance.

REFERENCE LITERATURE

Cheng-Chung Lee, "Optical thin films and film-forming techniques", Agne gijutsu center Inc.

The optical admittance is a ratio of an electric field intensity and a magnetic field intensity in a medium. When $Y0=\sqrt{\varepsilon 0/\mu 0}$ that is a value in vacuum is used as a unit, the optical admittance can be considered as being equivalent to a refractive index of the medium.

Figures 2A, 2B, 2C:
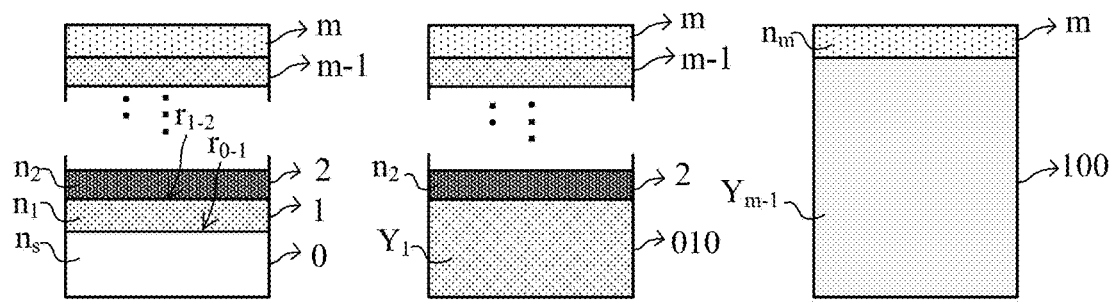
FIGS. 2A to 2C describes equivalent optical admittances of thin film layers in the embodiment.

Description will be made of a case where, as a structure illustrated in FIG. 2A, a ray vertically reaches a boundary $r_{0-1}$ between the substrate 0 and the thin film (first thin film) 1 and a boundary $r_{1-2}$ between the thin film layer 1 and the thin film layer 2. An electric field intensity and a magnetic field intensity at the boundary $r_{0-1}$ are respectively represented by Et and Ht, and an electric field intensity and a magnetic field intensity at the boundary $r_{1-2}$ are respectively represented by Ei and Hi.

Since the optical admittance of the thin film layer 1 is equivalent to a refractive index $n_1$ of the thin film layer 1, Et, Ht, Ei and Hi at the boundaries $r_{0-1}$ and $r_{1-2}$ has a relation expressed by following expression (1).

$$\begin{bmatrix} Ei \\ Hi \end{bmatrix} = \begin{bmatrix} \cos\delta_1 & \frac{i}{n_1}\sin\delta_1 \\ in_1\sin\delta_1 & \cos\delta_1 \end{bmatrix} \begin{bmatrix} Et \\ Ht \end{bmatrix} \quad (1)$$

A phase difference $\delta_1$ of the thin film layer 1 is expressed as follows where $d_1$ represents a film thickness of the thin film layer 1 and $n_1$ represents the refractive index of the thin film layer 1 for a wavelength $\lambda$ of an incident light.

$$\delta_1 = 2\pi n_1 d_1/\lambda \quad (2)$$

Expression (1) is rewritten as following expression (3) using an optical admittance $Yt=Et/Ht=n_s$ of the substrate 0.

$$\begin{bmatrix} B_1 \\ C_1 \end{bmatrix} = \begin{bmatrix} \cos\delta_1 & \frac{i}{n_1}\sin\delta_1 \\ in_1\sin\delta_1 & \cos\delta_1 \end{bmatrix} \begin{bmatrix} 1 \\ Yt \end{bmatrix} \quad (3)$$

When $Y_1=C_1/B_1$, $Y_1$ is an equivalent optical admittance of the substrate 0 and the thin film layer 1, which is calculated from the boundaries $r_{0-1}$ and $r_{1-2}$ and the thin film layer 1. That is, the structure illustrated in FIG. 2A is equivalent to a structure illustrated in FIG. 2B, so that the substrate 0 and the thin film layer 1 can be considered as a virtual layer 010 having an equivalent refractive index $Y_1$. Repeating this procedure (m−1) times makes it possible to simply express the substrate 0 and the lower layer 11 (1 to m−1) in the structure in FIG. 2A as a virtual layer 100 having an equivalent optical admittance $Y_{m-1}$ as illustrated in FIG. 2C. The equivalent optical admittance $Y_{m-1}$ is expressed by following expression (4) using refractive indices $n_j$ (j=1 to m−1) and phase differences $\delta_j$ (j=1 to m−1) of the thin film layers including the lower layer 11:

$$\begin{bmatrix} B_{m-1} \\ C_{m-1} \end{bmatrix} = \prod_{j=1}^{m-1} \begin{bmatrix} \cos\delta_j & \frac{i}{n_j}\sin\delta_j \\ in_j\sin\delta_j & \cos\delta_j \end{bmatrix} \begin{bmatrix} 1 \\ Yt \end{bmatrix} \quad (4)$$

where $Y_{m-1}=C_{m-1}/B_{m-1}$.

On the other hand, from expression (4), an equivalent optical admittance $Y_m=C_m/B_m$ from the substrate 0 to the uppermost layer m is expressed by following expression (5).

$$\begin{bmatrix} B_m \\ C_m \end{bmatrix} = \begin{bmatrix} \cos\delta_m & \frac{i}{n_m}\sin\delta_m \\ in_m\sin\delta_m & \cos\delta_m \end{bmatrix} \begin{bmatrix} 1 \\ Y_{m-1} \end{bmatrix} \quad (5)$$

A refractive index of air is 1, and a reflectance at the boundary between the uppermost layer m and the air is 0 when $Y_m$ is as follows.

$$Y_m = C_m/B_m = 1 \quad (6)$$

The equivalent optical admittance $Y_{m-1}$ for the wavelength $\lambda$ of the incident light (the wavelength $\lambda$ is hereinafter referred to as "an incident wavelength") is expressed in complex notation as follows:

$$Y_{m-1}(\lambda) = a + ib.$$

In this case, when the reflectance at the boundary between the uppermost layer m and the air is 0, a locus of complex coordinates (a, b) becomes, from expressions (5) and (6), a circle whose center is located at $((n_m^2+1)/2, 0)$ and whose radius is $(n_m^2-1)/2$. A position (point) of the complex coordinates (a, b) is uniquely specified from the incident wavelength $\lambda$ and the film thickness $d_m$ of the uppermost layer m. For example, when the uppermost layer m has a refractive index of 1.25, the locus of complex coordinates (a, b) becomes a circle whose center is located at (1.28, 0) and whose radius id 0.28. In order to reduce a reflectance of the antireflection coating 10 to near 0%, it is only necessary to form the lower layer 11 such that the complex coordinates (a, b) on that circle is close to a point uniquely specified by the incident wavelength λ and the film thickness $d_m$ of the uppermost layer m.

The antireflection coating 10 of this embodiment is characterized in having a high antireflection performance in a wavelength range from 430 nm to 1800 nm in which not only visible light but also airglow can be used. In order to achieve this characteristic, the complex coordinates (a, b) of the equivalent optical admittance from the substrate 0 to the lower layer 11 (the equivalent optical admittance is hereinafter simply referred to as "an optical admittance of the lower layer 11") satisfy the following conditions.

$$(a-1.13)^2+(b-0.24)^2 \leq 0.45^2 \text{ for } \lambda=430 \quad (7)$$

$$(a-1.33)^2+(b+0.05)^2 \leq 0.25^2 \text{ for } \lambda=900 \quad (8)$$

$$(a-1.14)^2+(b+0.25)^2 \leq 0.29^2 \text{ for } \lambda=1800 \quad (9)$$

As described above, when the complex coordinates (a, b) are located near the point uniquely specified, on the above-described circle, by the incident wavelength λ and the refractive index $n_m$ and the film thickness $d_m$ of the uppermost layer m, the reflectance is reduced. Therefore, it is simply only necessary to form the lower layer 11 such that, in the wavelength range from 430 nm to 1800 nm, the complex coordinates (a, b) are located near the uniquely specified point on the circle. However, materials used for the lower layer 11 are limited in reality, so that it is difficult to realize a film structure of the lower layer 11 such that, in the wide wavelength range from 430 nm to 1800 nm, the complex coordinates (a, b) are located near the uniquely specified point on the circle.

On the other hand, using a film structure satisfying the conditions of expressions (7), (8) and (9) enables forming such a lower layer 11 using general materials, which achieves a low reflectance in the wide wavelength range from 430 nm to 1800 nm.

It is more desirable that the complex coordinates (a, b) of the optical admittance of the lower layer 11 satisfy the following conditions.

$$(a-1.10)^2+(b-0.22)^2 \leq 0.26^2 \text{ for } \lambda=430 \quad (10)$$

$$(a-1.33)^2+(b+0.05)^2 \leq 0.20^2 \text{ for } \lambda=900 \quad (11)$$

$$(a-1.18)^2+(b+0.26)^2 \leq 0.25^2 \text{ for } \lambda=1800 \quad (12)$$

It is further desirable that the complex coordinates (a, b) of the optical admittance of the lower layer 11 satisfy at least one of the following conditions in the wavelength range of 430≤λ≤1800:

$$(a-1.09)^2+(b-0.20)^2 \leq 0.35^2 \quad (13)$$

$$(a-1.28)^2+b^2 \leq 0.35^2 \quad (14)$$

$$(a-1.27)^2+(b+0.28)^2 \leq 0.35^2 \quad (15)$$

It is desirable that the film thickness $d_m$ (nm) of the uppermost layer m satisfy the following condition.

$$125 \leq n_m \times d_m \leq 250 \quad (16)$$

In general, an optical film thickness of a thin film on a substrate corresponding to a quarter of an incident wavelength λ makes its reflectance minimum.

In the embodiment, in a case where the wavelength range is a wide range from 430 nm to 1800 nm, when a vicinity of an inverse of an intermediate point of an inverse of this wavelength range is four times of the optical film thickness, a low reflectance is provided.

Furthermore, it is desirable that the antireflection coating 10 have, for a ray in the wavelength range from 430 nm to 1800 nm, a reflectance of 1.5% or less when an incident angle of the ray is 0° or more and 15° or less and have a reflectance of 4.5% or less when the incident angle is 30° or more and 45° or less.

Moreover, it is desirable that a number of layers of the antireflection coating 10 (total layer number of the lower layer 11 and the uppermost layer m) be nine or more. This is because a smaller total layer number than nine makes it difficult to improve the antireflection performance.

In addition, when, among materials of (two or more layers of) the lower layer 11, a highest refractive index material has a refractive index represented by $n_H$, and a lowest refractive index material has a refractive index represented by $n_L$, it is desirable that $n_H$ and $n_L$ satisfy the following condition.

$$0.4 \leq n_H - n_L \leq 0.9 \quad (17)$$

This is because a large difference between the refractive indices of these materials makes it easy to achieve a low reflectance in a wide wavelength range.

The uppermost layer m is formed of a low refractive index material included in inorganic materials and organic materials. Such low refractive index inorganic materials include oxide silicon such as silica ($SiO_2$) and magnesium fluoride ($MgF_2$), and such low refractive index organic materials include silicon resin and non-crystalline fluorine resin. The uppermost layer m includes voids thereinside. Air (whose refractive index is 1.0) contained in the voids reduces the refractive index of the uppermost layer m. In addition, the uppermost layer m is desirable to be a film formed by binding hollow fine particles or solid fine particles with a binder. These fine particles are desirable in order to reduce the refractive index to be chiefly formed of a low reflectance material such as $SiO_2$ or $MgF_2$.

On the other hand, the lower layer 11 is desirable to be formed of any one of oxides of titanium, tantalum, zirconia, chromium, niobium, cerium, hafnium, aluminium, silicon and yttrium, or a mixture thereof. The thin film layer 1 as the first layer of the lower layer 11 is desirable in order to prevent white opaque and others to be formed of $Al_2O_3$, $SiN_x$, SiON or $Nb_2O_5$.

The uppermost layer m formed by binding the fine particles with the binder is desirable to be formed by, as a film forming method, a sol-gel method. A coating method for the uppermost layer m is not limited to a particular one, that is, common coating methods for coating with coating liquids can be used such as a dip coating method, a spin coating method, a spray coating method and a roll coating method. From a viewpoint of enabling forming a film whose film thickness is uniform on the substrate 0 such as a lens having a curved surface, the spin coating method is desirable to be used.

After the coating, the uppermost layer m is dried using a dryer, a hot plate, an electric furnace or the like. The drying is performed under conditions of temperature and time that do not influence the substrate 0 and that can evaporate organic solvent inside and between the fine particles. In general, it is desirable to use a temperature of 300° C. or less. A number of times of the coating is normally desirable to be one, but the coating and the drying may be repeated multiple times.

The lower layer 11 is desirable in order to simplify film formation to be formed by a dry method such as a vacuum evaporation method or a sputtering method.

Next, specific embodiments will be described. These embodiments are merely examples, and thus embodiments of the present invention are not limited thereto.

Embodiments 1 to 7

An antireflection coating 10 of each of Embodiments 1 to 7 is formed as a multi-layer film including thirteen layers. In Embodiments 1 to 7, the substrates 0 have mutually different refractive indices, but materials of thin films forming the antireflection coatings 10 are mutually identical.

Table 1 shows film structures of Embodiments 1 to 7. First to twelfth layers constitute a lower layer 11, which are formed on a substrate 0 by a vacuum evaporation method.

An uppermost layer as a thirteenth layer is formed by performing coating with a coating liquid, which is produced by adding a binder to a solution containing hollow $SiO_2$ fine particles and mixing them, with a spin coater and then performing burning for one hour in a clean oven whose temperature is from 100 to 250° C.

The uppermost layer thus formed is adjusted such that, in all of Embodiments 1 to 7, its refractive index for a d-line (587.6 nm) is 1.25 and its film thickness is 145 nm.

Figure 3:
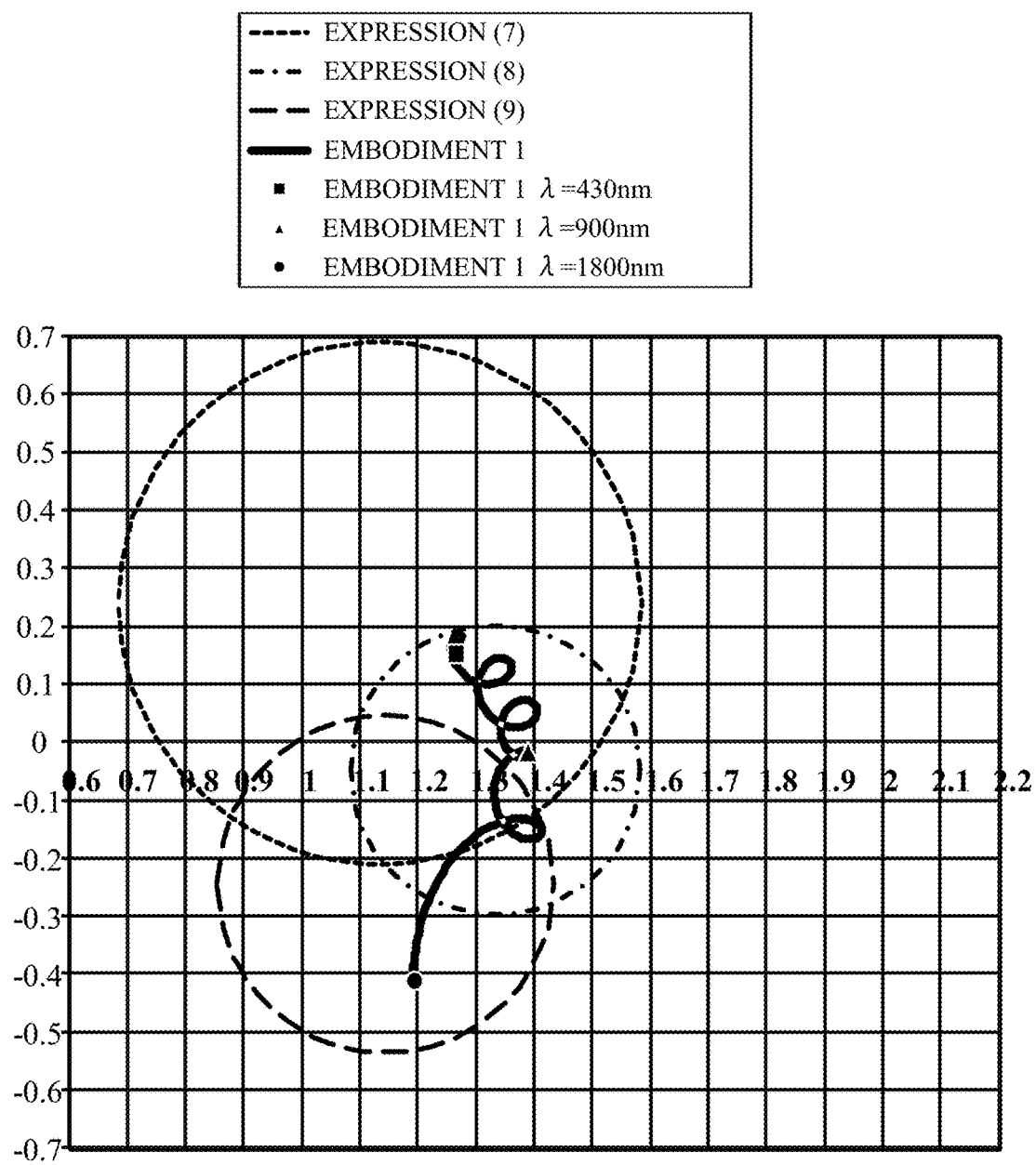
FIG. 3 illustrates an optical admittance of Embodiment 1 in a complex coordinate system.

FIG. 3 illustrates an optical admittance of the lower layer 11 (that is, an equivalent optical admittance from the substrate 0 to the lower layer 11) in Embodiment 1 in a complex coordinate system.

A horizontal axis indicates a real part a of Y=a+ib, and a vertical axis indicates an imaginary part b thereof. The upper limit of the condition of expression (7) is illustrated by a short broken line circle, the upper limit of the condition of expression (8) is illustrated by a dashed-dotted line circle, and the upper limit of the condition of expression (9) is illustrated by a long broken line circle. Optical admittances (complex coordinates) inside these circles satisfy the corresponding conditions. This also applies to other embodiments described later.

Furthermore, a locus of complex coordinates of the optical admittance when an incident wavelength λ is from 430 nm to 1800 nm is illustrated by a solid line. Complex coordinates for λ=430 nm are illustrated by a black rectangle, complex coordinates for λ=900 nm are illustrated by a black triangle, and complex coordinates for λ=1800 nm is illustrated by a black circle (point).

As understood from FIG. 3, the optical admittances of the lower layer 11 in Embodiment 1 for λ=430 nm, 900 nm and 1800 nm satisfy the conditions of expressions (7), (8) and (9).

Figure 4:
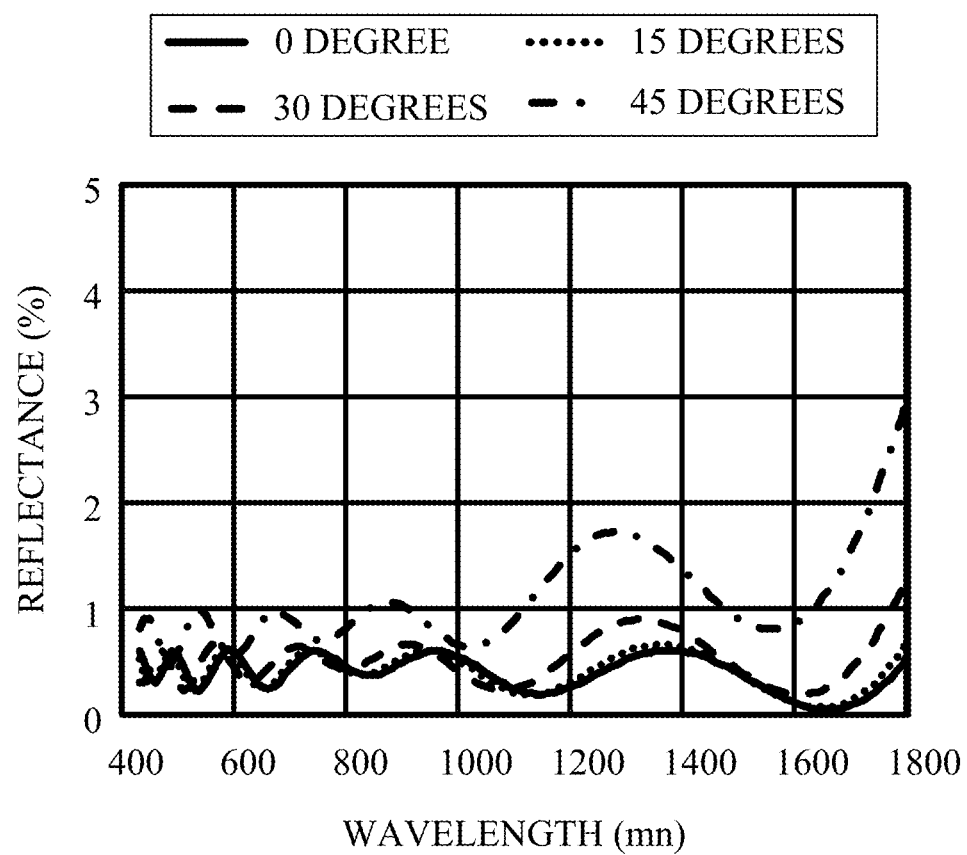
FIG. 4 illustrates a reflectance characteristic of an antireflection coating of Embodiment 1.

FIG. 4 illustrates reflectances in a wavelength range from 430 to 1800 nm in Embodiment 1. A reflectance for an incident angle of 0 degree (vertical incidence) is illustrated by a solid line, a reflectance for an incident angle of 15 degrees is illustrated by a dotted line, a reflectance for an incident angle of 30 degrees is illustrated by a broken line, and a reflectance for an incident angle of 45 degrees is illustrated by a dashed-dotted line. As understood from FIG. 4, in the wavelength range from 430 to 1800 nm, the reflectances in Embodiment 1 are 1.5% or less for the incident angles of 0 and 15 degrees and 4.5% or less for the incident angles of 30 and 45 degrees, which provides a high antireflection performance.

Figure 5:
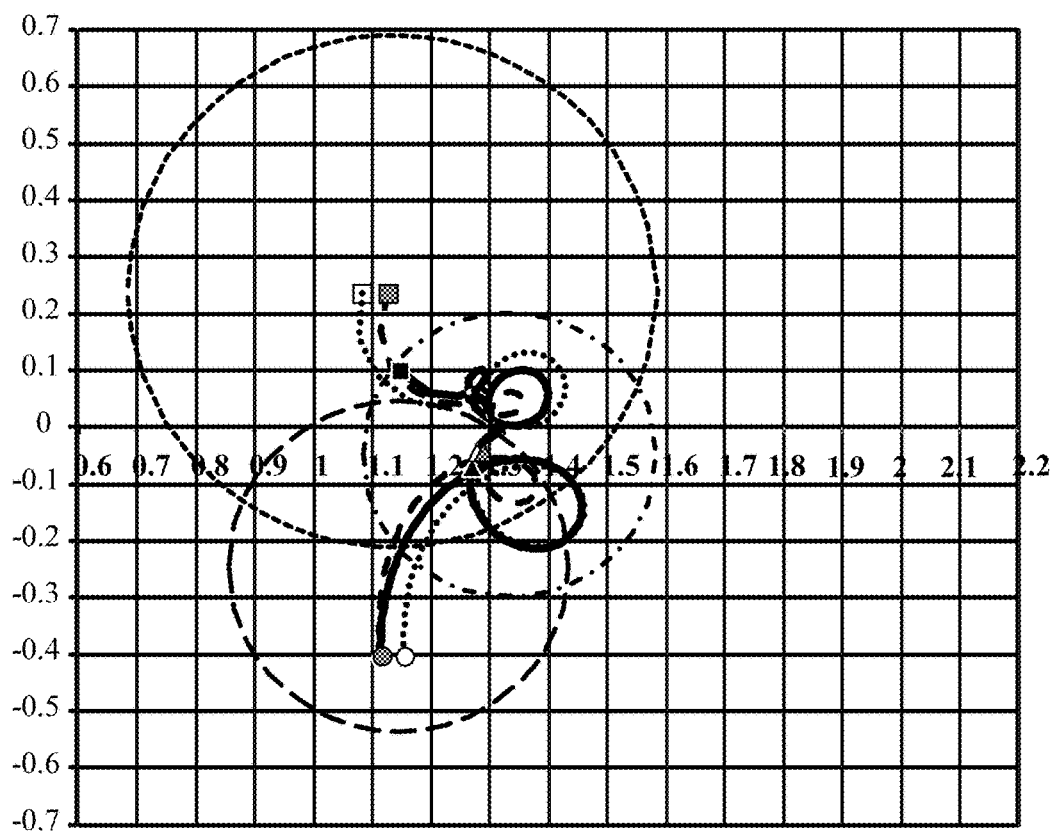
FIG. 5 illustrates optical admittances of lower layers of antireflection coatings of Embodiments 2 to 4 in the complex coordinate system.

FIG. 5 illustrates optical admittances of the lower layers 11 in Embodiments 2, 3 and 4 in the complex coordinate system. Loci of complex coordinates of the optical admittances when the incident wavelength λ is from 430 nm to 1800 nm in Embodiments 2, 3 and 4 are illustrated respectively by a solid line, a short broken line and a long broken line. Complex coordinates for λ=430 nm in Embodiments 2, 3 and 4 are illustrated respectively by a black rectangle, a white rectangle and a gray rectangle. Complex coordinates for λ=900 nm in Embodiments 2, 3 and 4 are illustrated respectively by a black triangle, a whit triangle and a gray triangle. Complex coordinates for λ=1800 nm in Embodiments 2, 3 and 4 are illustrated respectively by a black circle, a whit circle and a gray circle.

Figure 6:
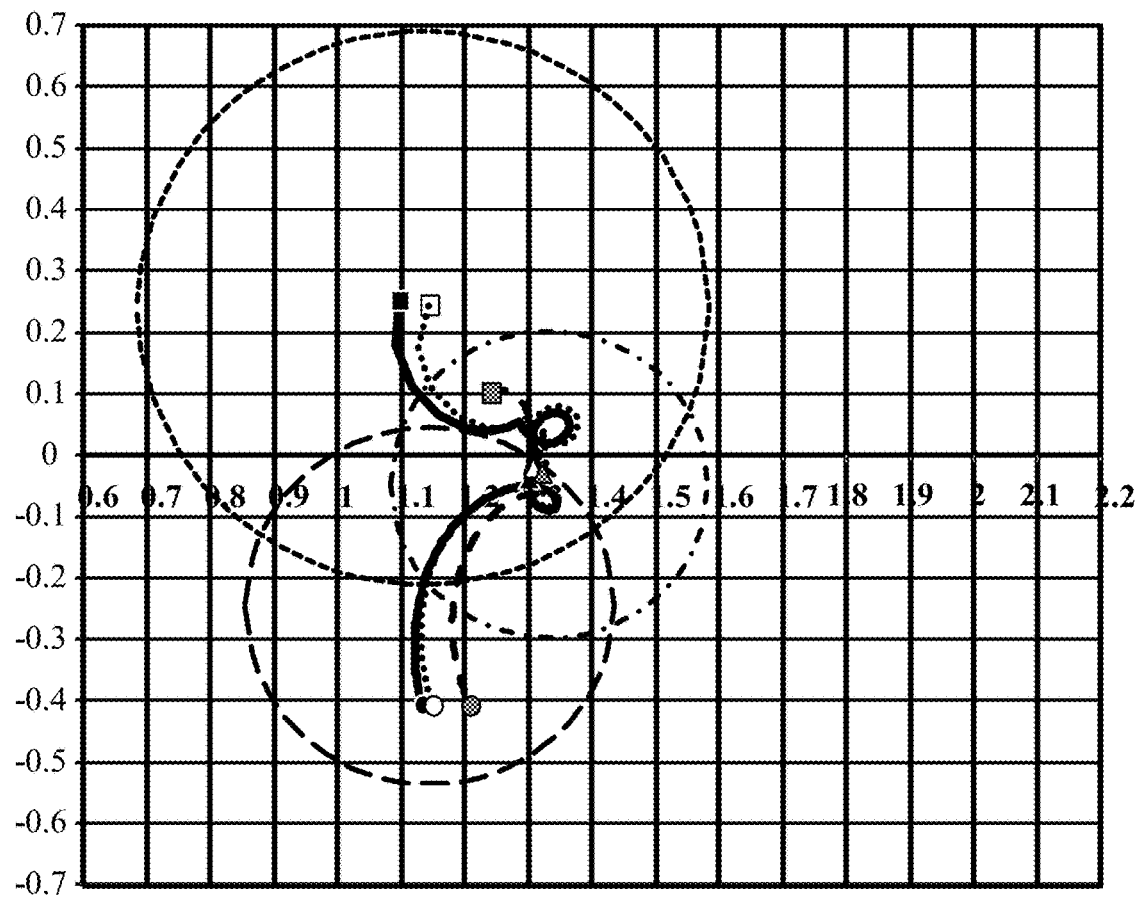
FIG. 6 illustrates optical admittances of lower layers of antireflection coatings of Embodiments 5 to 7 in the complex coordinate system.
Figure 7:
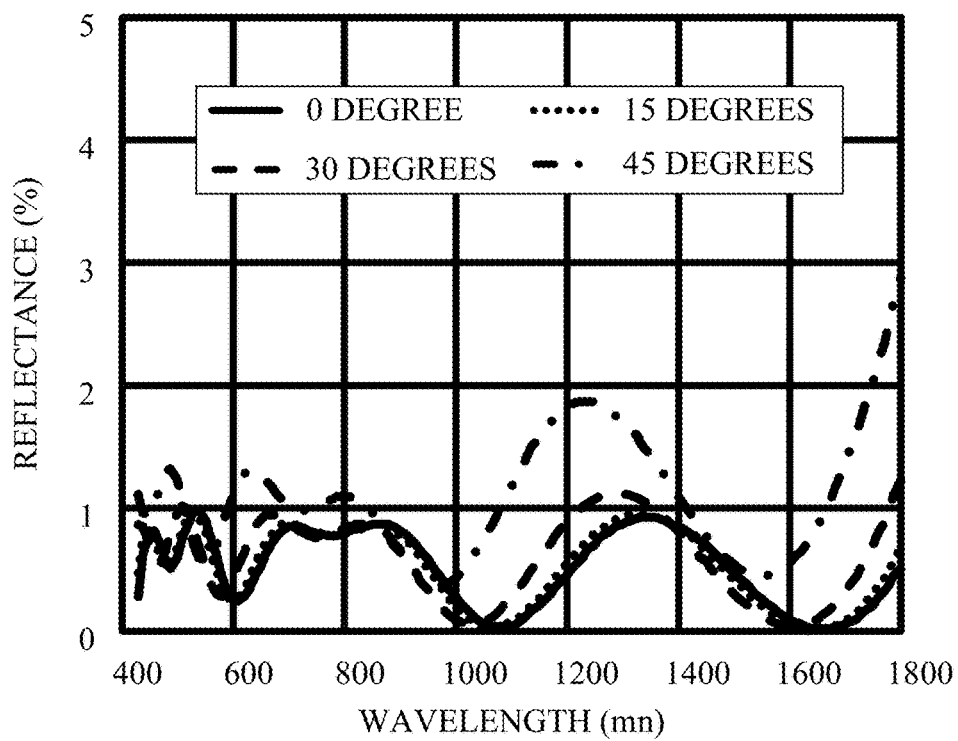
FIG. 7 illustrates a reflectance characteristic of the antireflection coating of Embodiment 2.
Figure 8:
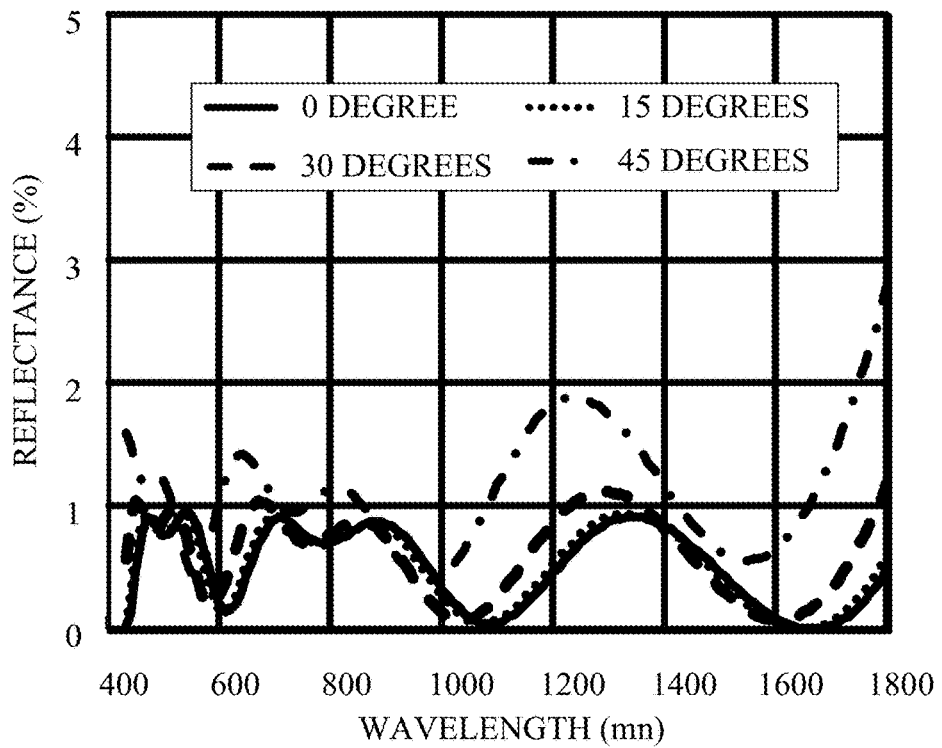
FIG. 8 illustrates a reflectance characteristic of the antireflection coating of Embodiment 3.
Figure 9:
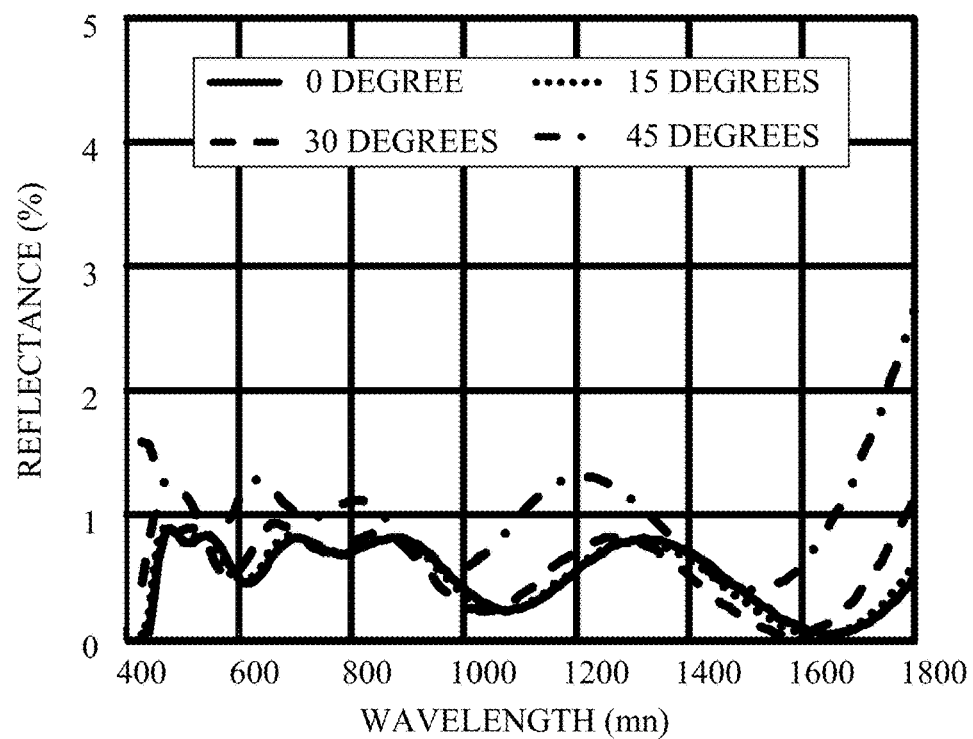
FIG. 9 illustrates a reflectance characteristic of the antireflection coating of Embodiment 4.
Figure 10:
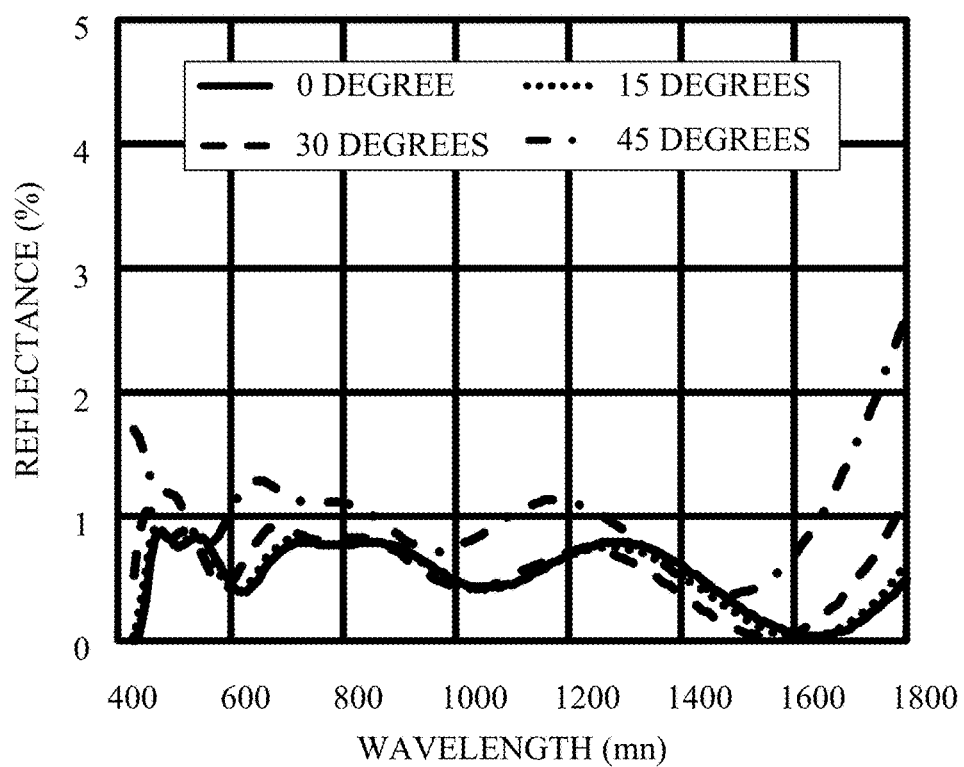
FIG. 10 illustrates a reflectance characteristic of the antireflection coating of Embodiment 5.
Figure 11:
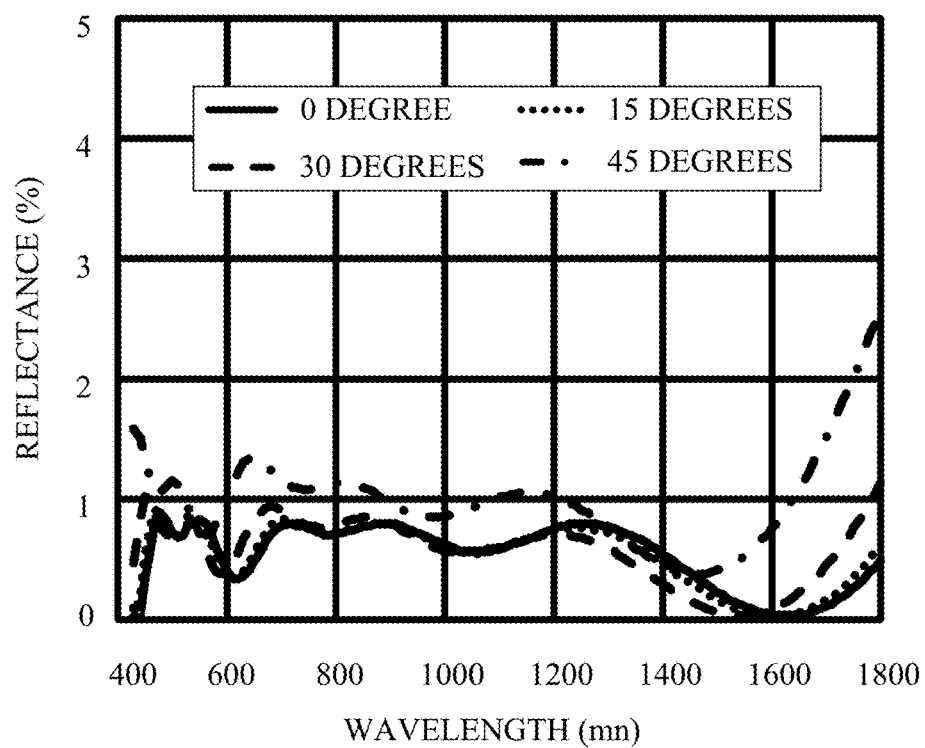
FIG. 11 illustrates a reflectance characteristic of the antireflection coating of Embodiment 6.
Figure 12:
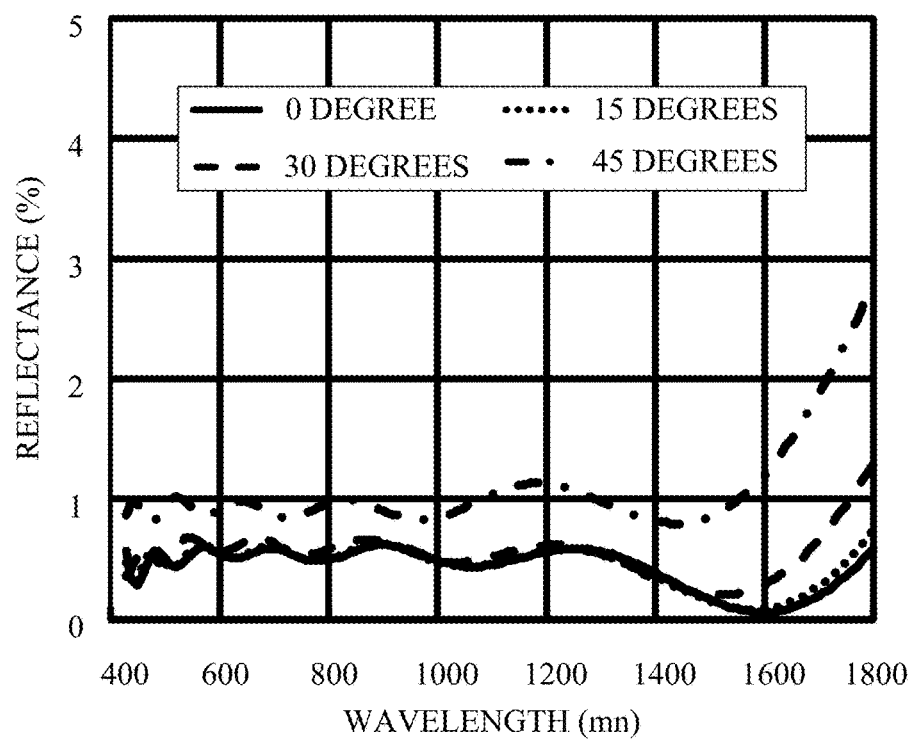
FIG. 12 illustrates a reflectance characteristic of the antireflection coating of Embodiment 7.

FIG. 6 illustrates optical admittances of the lower layers 11 in Embodiments 5, 6 and 7 in the complex coordinate system. Loci of complex coordinates of the optical admittances when the incident wavelength λ is from 430 nm to 1800 nm in Embodiments 5, 6 and 7 are illustrated respectively by a solid line, a short dashed line and a long dashed line. Complex coordinates for λ=430 nm in Embodiments 5, 6 and 7 are illustrated respectively by a black rectangle, a white rectangle and a gray rectangle. Complex coordinates for λ=900 nm in Embodiments 5, 6 and 7 are illustrated respectively by a black triangle, a whit triangle and a gray triangle. Complex coordinates for λ=1800 nm in Embodiments 5, 6 and 7 are illustrated respectively by a black circle, a whit circle and a gray circle.

As understood from FIGS. 5 and 6, the optical admittances of the lower layer 11 in Embodiments 2 to 7 for λ=430 nm, 900 nm and 1800 nm satisfy the conditions of expressions (7), (8) and (9).

FIGS. 7 to 12 illustrate reflectances in the wavelength range from 430 to 1800 nm in Embodiments 2 to 7. In each drawing, a reflectance for the incident angle of 0 degree is illustrated by a solid line, a reflectance for the incident angle of 15 degrees is illustrated by a dotted line, a reflectance for the incident angle of 30 degrees is illustrated by a broken line, and a reflectance for the incident angle of 45 degrees is illustrated by a dashed-dotted line. As understood from FIGS. 7 to 12, in the wavelength range from 430 to 1800 nm, the reflectances in each of Embodiments 2 to 7 are 1.5% or less for the incident angles of 0 and 15 degrees and 4.5% or less for the incident angles of 30 and 45 degrees, which provides a high antireflection performance.

TABLE 1

| Layer | Material | Refractive index | | Embodiment 1 | 2 | 3 | 4 | 5 | 6 | 7 |
|---|---|---|---|---|---|---|---|---|---|---|
| 13th | Hollow $SiO_2$ | 1.25 | Physical Film Thickness (nm) | 145.0 | 145.0 | 145.0 | 145.0 | 145.0 | 145.0 | 145.0 |
| 12th | $Ta_2O_5$ | 2.30 | | 7.0 | 4.3 | 5.4 | 2.7 | 2.4 | 2.0 | 5.0 |
| 11th | $SiO_2$ | 1.46 | | 81.7 | 96.6 | 95.0 | 111.4 | 117.2 | 120.5 | 101.3 |
| 10th | $Ta_2O_5$ | 2.30 | | 20.2 | 21.3 | 23.2 | 20.7 | 20.5 | 19.6 | 21.9 |
| 9th | $SiO_2$ | 1.46 | | 33.8 | 37.4 | 37.2 | 41.4 | 42.8 | 43.7 | 42.6 |
| 8th | $Ta_2O_5$ | 2.30 | | 34.9 | 43.1 | 45.8 | 41.7 | 42.2 | 41.6 | 42.9 |
| 7th | $SiO_2$ | 1.46 | | 12.4 | 11.4 | 10.1 | 13.7 | 13.7 | 14.4 | 15.3 |
| 6th | $Ta_2O_5$ | 2.30 | | 161.9 | 172.1 | 175.0 | 170.0 | 168.4 | 172.0 | 188.3 |

TABLE 1-continued

| Layer | Material | Refractive index | | Embodiment | | | | | | |
|---|---|---|---|---|---|---|---|---|---|---|
| | | | | 1 | 2 | 3 | 4 | 5 | 6 | 7 |
| 5th | SiO$_2$ | 1.46 | | 14.5 | 16.9 | 17.3 | 15.0 | 13.6 | 12.2 | 8.9 |
| 4th | Ta$_2$O$_5$ | 2.30 | | 42.1 | 37.1 | 40.2 | 42.2 | 44.8 | 49.2 | 54.9 |
| 3rd | SiO$_2$ | 1.46 | | 35.0 | 37.3 | 35.5 | 29.2 | 26.0 | 22.5 | 16.3 |
| 2nd | Ta$_2$O$_5$ | 2.30 | | 20.2 | 17.2 | 19.4 | 20.0 | 27.1 | 34.7 | 40.1 |
| 1st | Al$_2$O$_3$ | 1.63 | | 119.6 | 116.7 | 15.0 | 4.6 | 12.8 | 14.7 | 10.0 |
| | Substrate | | Refractive index | 1.50 | 1.60 | 1.70 | 1.80 | 1.90 | 2.00 | 2.10 |

Embodiments 8 to 64

Tables 2 to 10 show film structures of Embodiments 8 to 64. In each of Embodiments 8 to 64, a lower layer 11 other than an uppermost layer is formed on a substrate 0 by a vacuum evaporation method. The uppermost layer is formed by performing coating with a coating liquid, which is produced by adding a binder to a solution containing hollow SiO$_2$ fine particles and mixing them, with a spin coater and then performing burning for one hour in a clean oven whose temperature is from 100 to 250° C.

Figure 13:
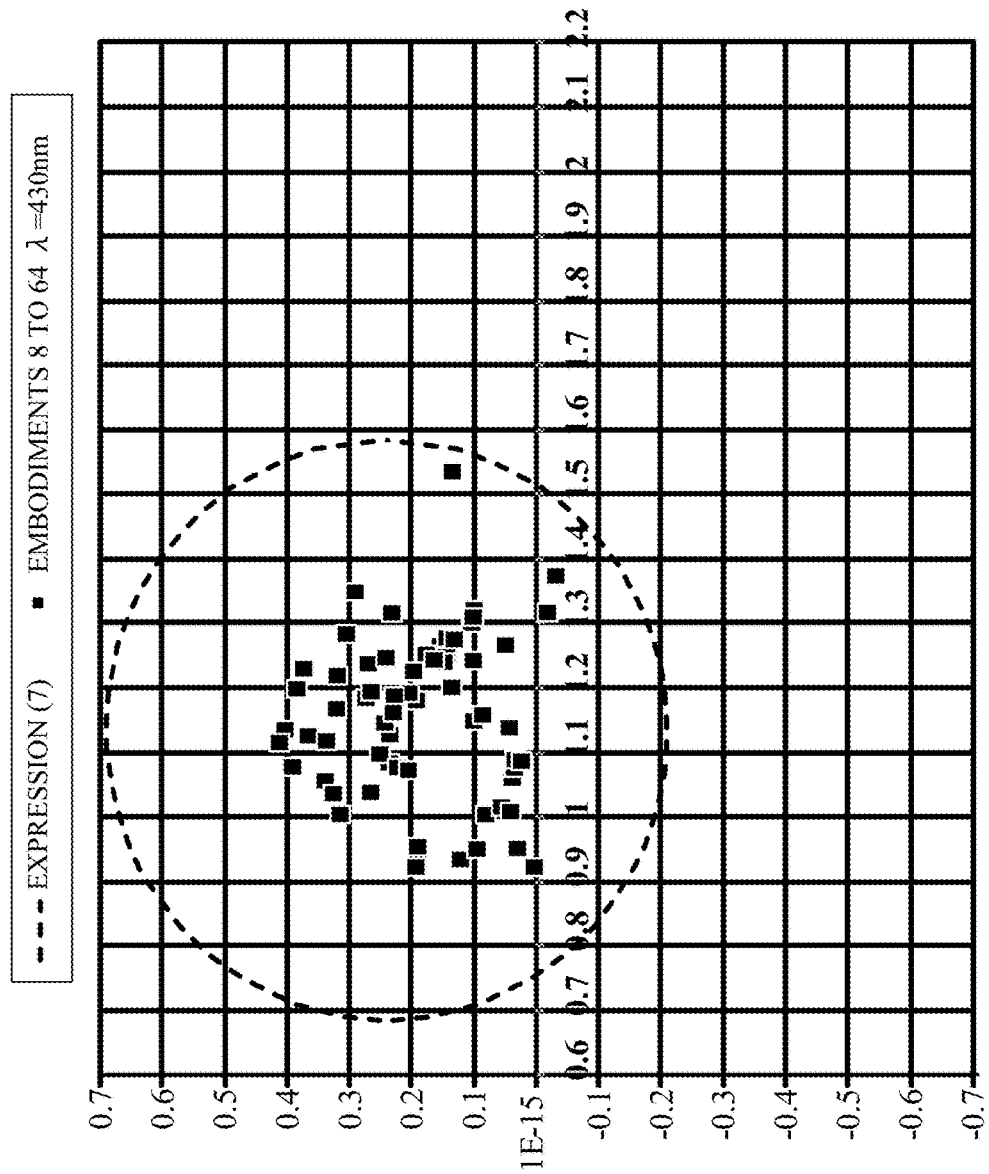
FIG. 13 illustrates optical admittances of lower layers of antireflection coatings of Embodiments 8 to 64 for $\lambda=430$ nm in the complex coordinate system.

FIG. 13 illustrates optical admittances of the lower layers 11 (each of which is an equivalent optical admittance from the substrate 0 to the lower layer 11) in Embodiments 8 to 64 for an incident wavelength λ=430 nm in a complex coordinate system. A horizontal axis indicates a real part a of Y=a+ib, and a vertical axis indicates an imaginary part b thereof. This also applies to complex coordinate systems illustrated in other drawings described later. The upper limit of the condition of expression (7) is illustrated by a short broken line circle. As understood from FIG. 13, the optical admittances of the lower layers 11 in Embodiments 8 to 64 for λ=430 nm satisfy the condition of expression (7).

Figure 14:
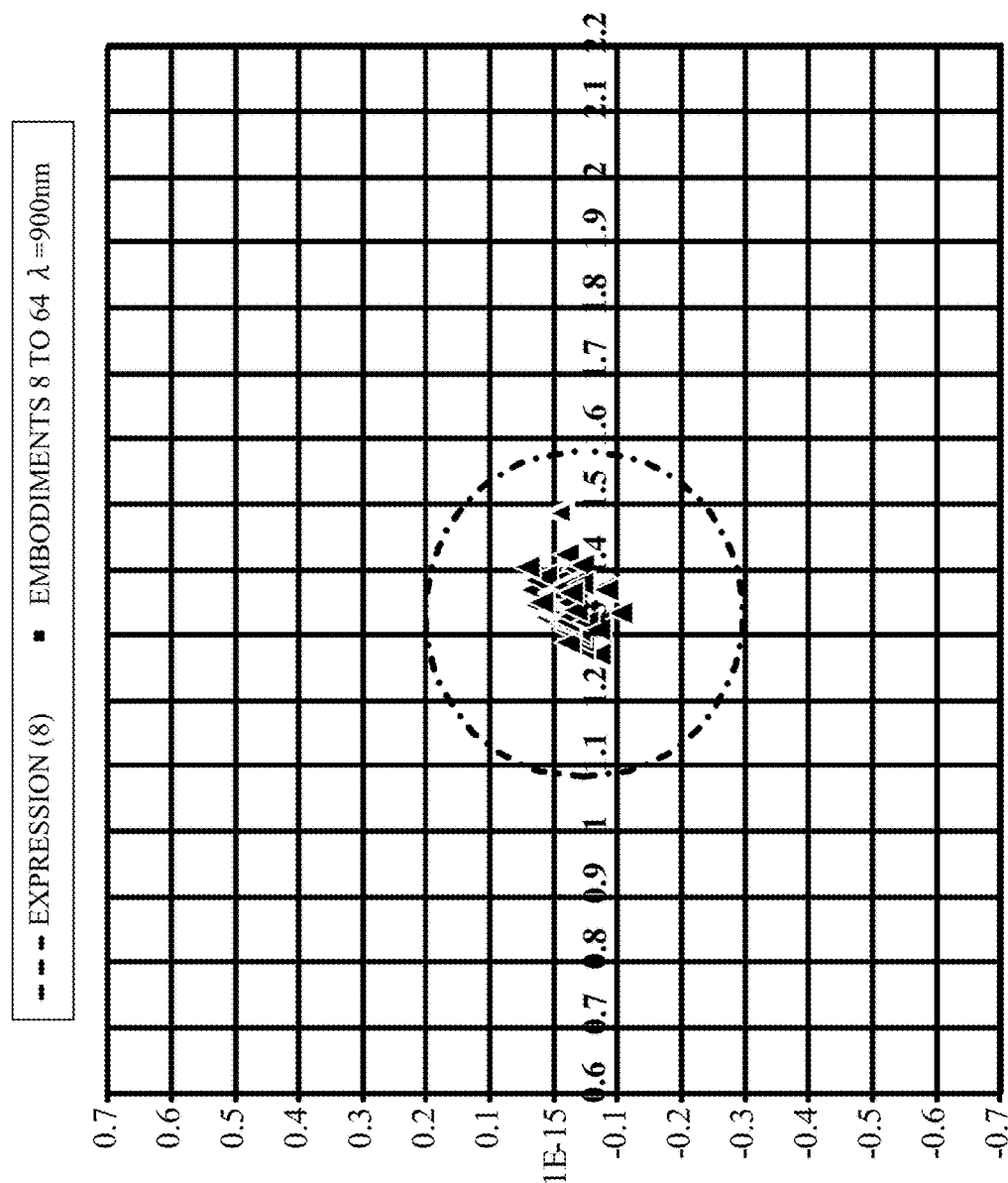
FIG. 14 illustrates optical admittances of lower layers of antireflection coatings of Embodiments 8 to 64 for $\lambda=900$ nm in the complex coordinate system.

FIG. 14 illustrates optical admittances of the lower layers 11 in Embodiments 8 to 64 for an incident wavelength λ=900 nm in the complex coordinate system. The upper limit of the condition of expression (8) is illustrated by a dashed-dotted line circle. As understood from FIG. 14, the optical admittances of the lower layers 11 in Embodiments 8 to 64 for λ=900 nm satisfy the condition of expression (8).

Figure 15:
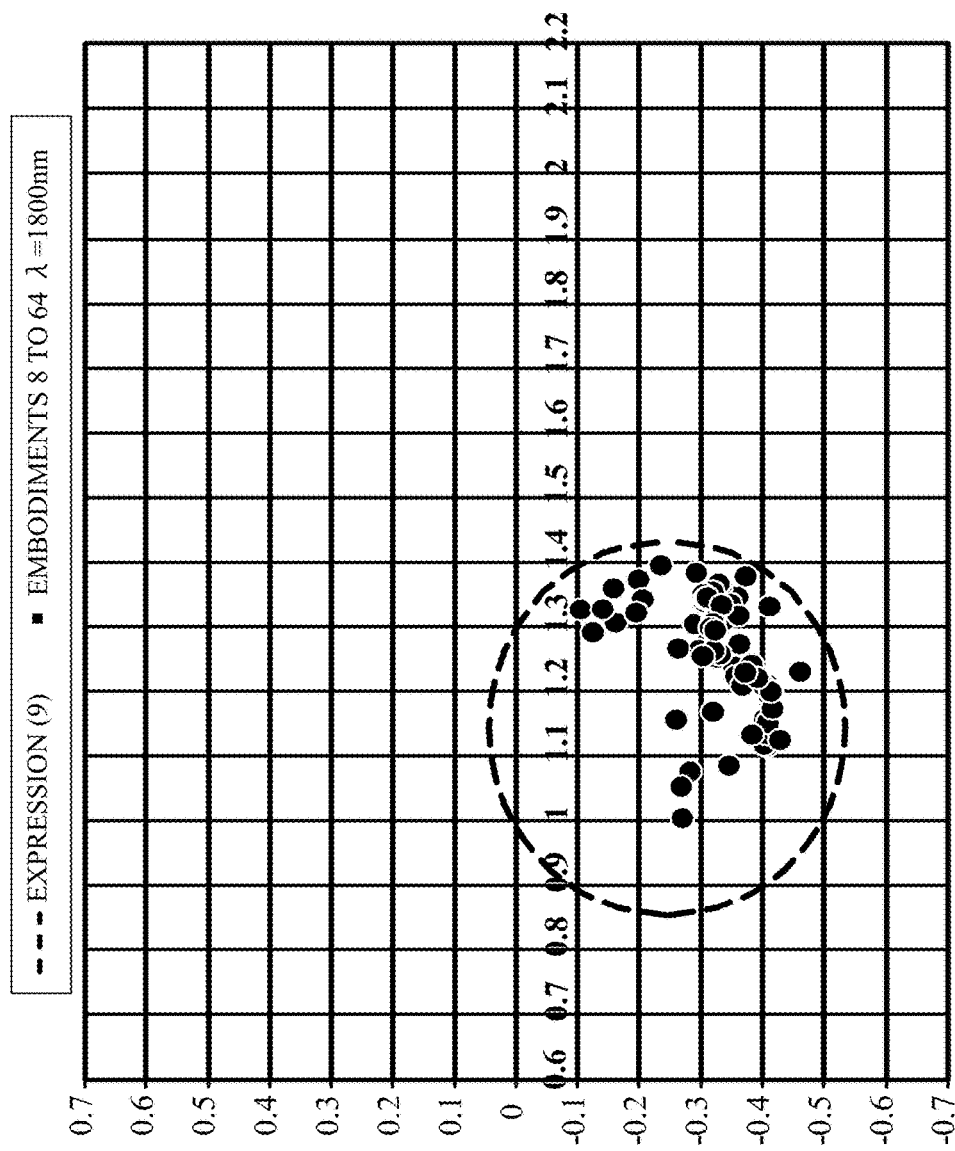
FIG. 15 illustrates optical admittances of lower layers of antireflection coatings of Embodiments 8 to 64 for $\lambda=1800$ nm in the complex coordinate system.

FIG. 15 illustrates optical admittances of the lower layers 11 in Embodiments 8 to 64 for an incident wavelength λ=1800 nm in the complex coordinate system. The upper limit of the condition of expression (9) is illustrated by a long broken line circle. As understood from FIG. 15, the optical admittances of the lower layers 11 in Embodiments 8 to 64 for λ=1800 nm satisfy the condition of expression (9).

Figure 16:
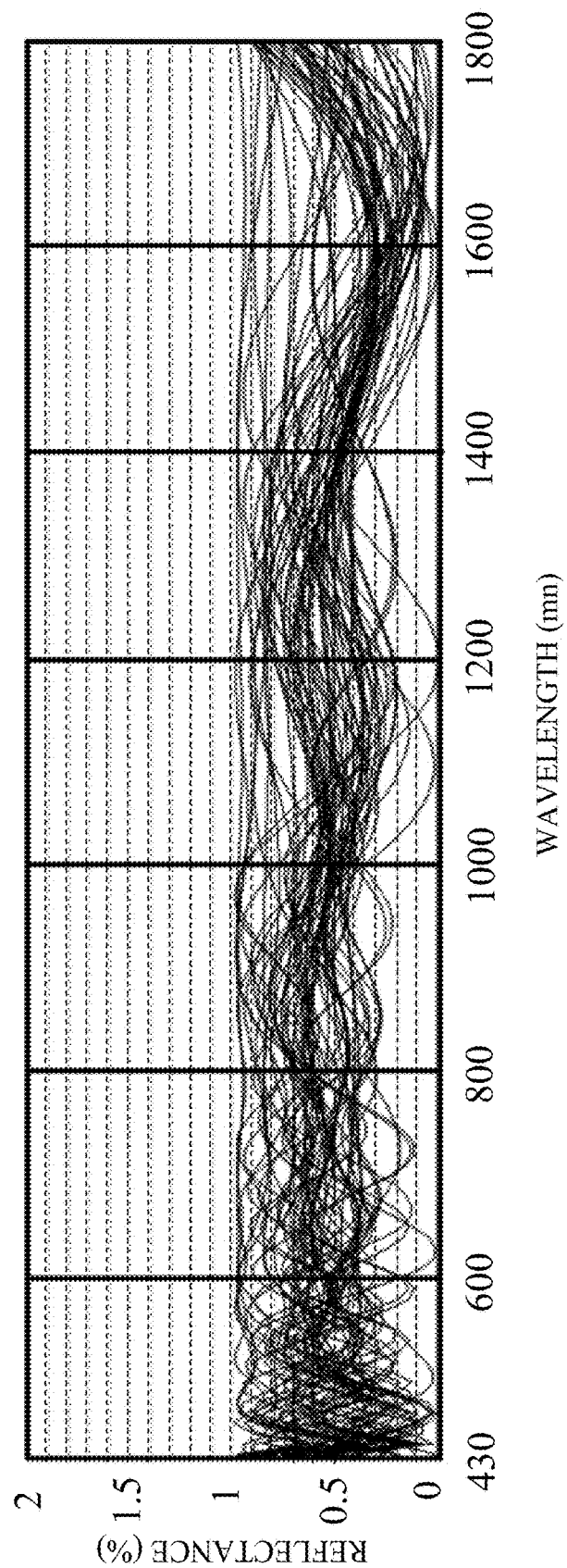
FIG. 16 illustrates reflectance characteristics of the antireflection coatings of Embodiments 8 to 64 for an incident angle of 0 degree.

FIG. 16 illustrates reflectances in the wavelength range from 430 to 1800 nm for an incident angle of 0 degree in Embodiments 8 to 64. As understood from FIG. 16, all of the reflectances in the wavelength range from 430 to 1800 nm are 1.5% or less, which provides an extremely high antireflection performance.

Figure 17:
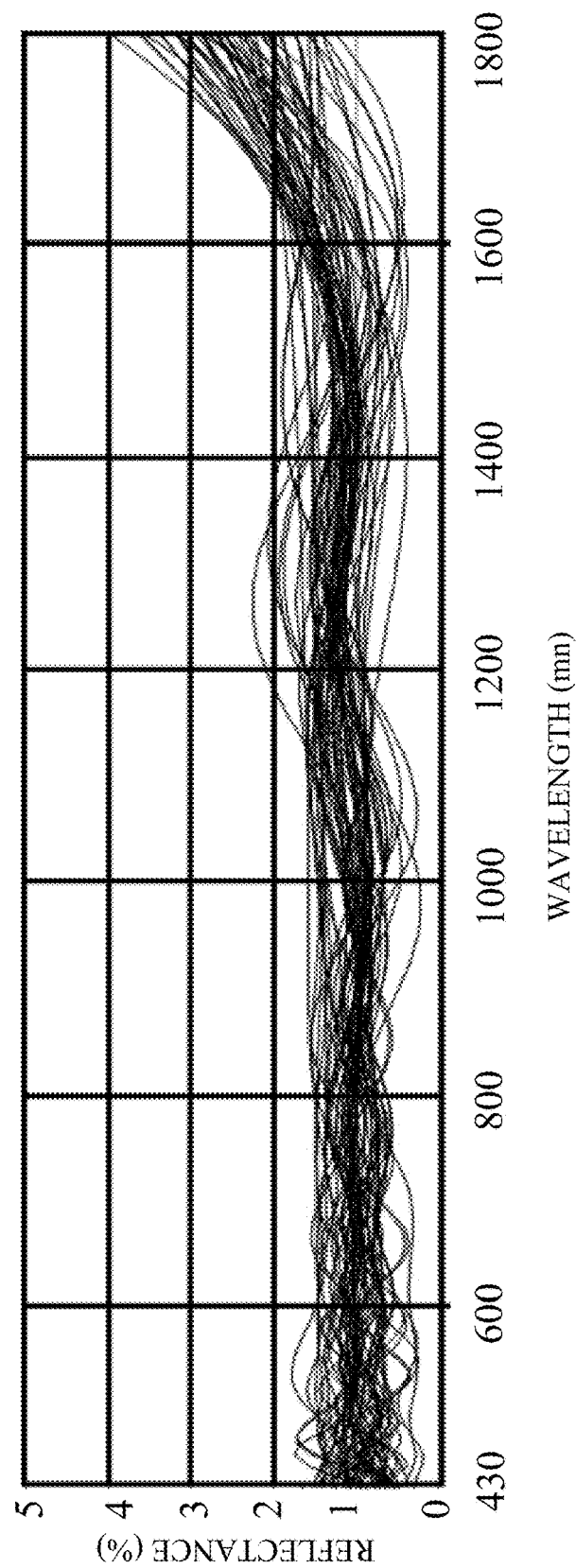
FIG. 17 illustrates reflectance characteristics of the antireflection coatings of Embodiments 8 to 64 for an incident angle of 45 degree.

FIG. 17 illustrates reflectances in the wavelength range from 430 to 1800 nm for an incident angle of 45 degrees in Embodiments 8 to 64. As understood from FIG. 17, all of the reflectances in the wavelength range from 430 to 1800 nm are 4.5% or less, which provides a high antireflection performance.

TABLE 2

| Layer | Material | Refractive index | | Embodiment | | | | | | |
|---|---|---|---|---|---|---|---|---|---|---|
| | | | | 8 | 9 | 10 | 11 | 12 | 13 | 14 |
| 12th | Hollow SiO$_2$ | 1.25 | Physical Film Thickness (nm) | 145.0 | 145.0 | 145.0 | 145.0 | 145.0 | 145.0 | 145.0 |
| 11th | Ta$_2$O$_5$ | 2.30 | | 5.0 | 5.0 | 5.0 | 5.0 | 5.0 | 5.0 | 5.0 |
| 10th | SiO$_2$ | 1.46 | | 130.1 | 128.0 | 122.2 | 117.8 | 116.9 | 115.5 | 112.7 |
| 9th | Ta$_2$O$_5$ | 2.30 | | 20.6 | 21.4 | 21.5 | 23.4 | 22.3 | 22.5 | 22.7 |
| 8th | SiO$_2$ | 1.46 | | 67.2 | 64.5 | 61.3 | 55.3 | 56.0 | 54.2 | 51.4 |
| 7th | Ta$_2$O$_5$ | 2.30 | | 32.4 | 35.1 | 37.7 | 42.8 | 41.9 | 42.9 | 44.3 |
| 6th | SiO$_2$ | 1.46 | | 58.6 | 52.8 | 47.1 | 37.6 | 36.4 | 32.7 | 27.3 |
| 5th | Ta$_2$O$_5$ | 2.30 | | 31.9 | 37.3 | 42.3 | 51.8 | 53.0 | 57.4 | 63.7 |
| 4th | SiO$_2$ | 1.46 | | 69.3 | 59.1 | 48.8 | 35.3 | 31.4 | 24.6 | 16.2 |
| 3rd | Ta$_2$O$_5$ | 2.30 | | 22.3 | 29.1 | 35.0 | 44.8 | 48.2 | 55.2 | 65.3 |
| 2nd | SiO$_2$ | 1.46 | | 85.5 | 66.5 | 51.3 | 38.4 | 30.8 | 22.7 | 14.3 |
| 1st | Ta$_2$O$_5$ | 2.30 | | 8.8 | 12.5 | 15.4 | 20.1 | 21.9 | 25.3 | 30.2 |
| | Substrate | | Refractive index | 1.50 | 1.60 | 1.70 | 1.80 | 1.90 | 2.00 | 2.10 |

TABLE 3

| Layer | Material | Refractive index | | Embodiment | | | | | | |
|---|---|---|---|---|---|---|---|---|---|---|
| | | | | 15 | 16 | 17 | 18 | 19 | 20 | 21 |
| Uppermost | Hollow SiO$_2$ | 1.25 | Physical Film Thickness | 145.0 | 145.0 | 145.0 | 145.0 | 145.0 | 145.0 | 145.0 |
| 16th | Ta$_2$O$_5$ | 2.30 | | | | | | | | 1.8 |

TABLE 3-continued

| Layer | Material | Refractive index | | Embodiment 15 | 16 | 17 | 18 | 19 | 20 | 21 |
|---|---|---|---|---|---|---|---|---|---|---|
| 15th | SiO$_2$ | 1.46 | (nm) | | | | | | 15.0 | 21.6 |
| 14th | Ta$_2$O$_5$ | 2.30 | | | | | | 7.5 | 7.8 | 6.4 |
| 13th | SiO$_2$ | 1.46 | | | | | 6.3 | 86.7 | 83.4 | 76.7 |
| 12th | Ta$_2$O$_5$ | 2.30 | | | | | 3.4 | 23.0 | 27.8 | 27.9 |
| 11th | SiO$_2$ | 1.46 | | | | 130.5 | 98.3 | 39.3 | 35.8 | 35.1 |
| 10th | Ta$_2$O$_5$ | 2.30 | | | 5.7 | 18.3 | 19.6 | 43.6 | 50.4 | 49.0 |
| 9th | SiO$_2$ | 1.46 | | 153.6 | 118.2 | 42.0 | 39.6 | 16.2 | 10.1 | 9.4 |
| 8th | Ta$_2$O$_5$ | 2.30 | | 16.0 | 21.3 | 38.2 | 37.2 | 71.3 | 111.1 | 118.8 |
| 7th | SiO$_2$ | 1.46 | | 68.7 | 60.7 | 15.7 | 14.6 | 8.6 | 7.8 | 7.5 |
| 6th | Ta$_2$O$_5$ | 2.30 | | 27.4 | 34.3 | 160.3 | 159.5 | 61.5 | 56.2 | 54.2 |
| 5th | SiO$_2$ | 1.46 | | 58.1 | 48.7 | 12.6 | 14.3 | 20.4 | 25.3 | 25.3 |
| 4th | Ta$_2$O$_5$ | 2.30 | | 28.7 | 35.6 | 39.4 | 39.5 | 39.6 | 38.6 | 37.8 |
| 3rd | SiO$_2$ | 1.46 | | 54.8 | 52.2 | 31.5 | 33.4 | 39.1 | 42.8 | 43.0 |
| 2nd | Ta$_2$O$_5$ | 2.30 | | 16.0 | 20.2 | 18.9 | 19.6 | 18.4 | 17.8 | 17.4 |
| 1st | Al$_2$O$_3$ | 1.63 | | 142.7 | 148.9 | 108.7 | 112.9 | 118.5 | 132.4 | 131.3 |
| | Substrate | Refractive index | | 1.50 | 1.50 | 1.50 | 1.50 | 1.50 | 1.50 | 1.50 |

TABLE 4

| Layer | Material | Refractive index | | Embodiment 22 | 23 | 24 | 25 | 26 | 27 | 28 |
|---|---|---|---|---|---|---|---|---|---|---|
| Uppermost | Hollow SiO$_2$ | 1.25 | Physical Film | 145.0 | 145.0 | 145.0 | 145.0 | 145.0 | 145.0 | 145.0 |
| 16th | Ta$_2$O$_5$ | 2.30 | Thickness | | | | | | | 5.0 |
| 15th | SiO$_2$ | 1.46 | (nm) | | | | | | 28.6 | 49.4 |
| 14th | Ta$_2$O$_5$ | 2.30 | | | | | | 5.0 | 5.0 | 3.6 |
| 13th | SiO$_2$ | 1.46 | | | | | 29.1 | 54.4 | 87.4 | 54.2 |
| 12th | Ta$_2$O$_5$ | 2.30 | | | | | 5.0 | 3.9 | 22.5 | 23.5 |
| 11th | SiO$_2$ | 1.46 | | | | 130.2 | 88.4 | 51.8 | 20.6 | 16.5 |
| 10th | Ta$_2$O$_5$ | 2.30 | | | 5.0 | 19.0 | 26.4 | 26.3 | 7.7 | 5.0 |
| 9th | SiO$_2$ | 1.46 | | 175.8 | 136.7 | 42.4 | 40.4 | 37.2 | 22.3 | 22.1 |
| 8th | Ta$_2$O$_5$ | 2.30 | | 14.3 | 19.3 | 39.4 | 48.2 | 47.5 | 46.7 | 46.6 |
| 7th | SiO$_2$ | 1.46 | | 69.0 | 61.9 | 14.9 | 13.5 | 12.4 | 12.7 | 11.8 |
| 6th | Ta$_2$O$_5$ | 2.30 | | 29.7 | 34.1 | 172.4 | 195.7 | 194.8 | 197.0 | 194.3 |
| 5th | SiO$_2$ | 1.46 | | 53.3 | 42.3 | 7.4 | 8.9 | 8.4 | 8.5 | 8.3 |
| 4th | Ta$_2$O$_5$ | 2.30 | | 41.0 | 44.8 | 47.1 | 56.6 | 57.9 | 56.3 | 57.4 |
| 3rd | SiO$_2$ | 1.46 | | 33.8 | 28.3 | 11.4 | 16.4 | 15.8 | 16.0 | 15.7 |
| 2nd | Ta$_2$O$_5$ | 2.30 | | 41.5 | 40.6 | 26.2 | 41.0 | 42.7 | 40.9 | 42.1 |
| 1st | Al$_2$O$_3$ | 1.63 | | 20.2 | 12.6 | 2.9 | 10.0 | 10.0 | 10.0 | 10.0 |
| | Substrate | Refractive index | | 2.10 | 2.10 | 2.10 | 2.10 | 2.10 | 2.10 | 2.10 |

TABLE 5

| Layer | Material | Refractive index | | Embodiment 29 | 30 | 31 | 32 | 33 | 34 | 35 |
|---|---|---|---|---|---|---|---|---|---|---|
| Uppermost | Hollow SiO$_2$ | 1.25 | Physical Film | 145.0 | 145.0 | 145.0 | 145.0 | 145.0 | 145.0 | 145.0 |
| 16th | Ta$_2$O$_5$ | 2.30 | Thickness | | | | | | | 17.5 |
| 15th | SiO$_2$ | 1.46 | (nm) | | | | | | 2.7 | 7.5 |
| 14th | Ta$_2$O$_5$ | 2.30 | | | | | | 40.9 | 36.9 | 67.5 |
| 13th | SiO$_2$ | 1.46 | | | | | 5.0 | 6.4 | 7.5 | 9.9 |
| 12th | Ta$_2$O$_5$ | 2.30 | | | | 130.1 | 112.3 | 84.1 | 64.3 | 19.6 |
| 11th | SiO$_2$ | 1.46 | | | | 4.9 | 24.6 | 30.7 | 31.0 | 20.6 |
| 10th | Ta$_2$O$_5$ | 2.30 | | | 150.1 | 41.8 | 49.5 | 44.4 | 25.3 | 15.0 |
| 9th | SiO$_2$ | 1.46 | | | 17.6 | 15.4 | 48.8 | 55.4 | 28.6 | 17.2 |
| 8th | Ta$_2$O$_5$ | 2.30 | | 166.5 | 70.0 | 66.1 | 30.8 | 28.5 | 4.1 | 11.4 |
| 7th | SiO$_2$ | 1.46 | | 13.3 | 30.0 | 26.5 | 55.8 | 59.3 | 162.4 | 178.1 |
| 6th | Ta$_2$O$_5$ | 2.30 | | 80.2 | 63.1 | 67.7 | 37.7 | 37.9 | 19.8 | 19.8 |
| 5th | SiO$_2$ | 1.46 | | 21.5 | 29.8 | 24.9 | 38.3 | 40.0 | 43.2 | 43.1 |
| 4th | Ta$_2$O$_5$ | 2.30 | | 77.7 | 70.0 | 76.4 | 60.0 | 60.5 | 48.3 | 48.8 |
| 3rd | SiO$_2$ | 1.46 | | 18.4 | 19.6 | 16.3 | 19.2 | 21.8 | 24.4 | 24.5 |
| 2nd | Ta$_2$O$_5$ | 2.30 | | 81.6 | 80.0 | 83.7 | 75.3 | 78.5 | 71.6 | 72.7 |
| 1st | Al$_2$O$_3$ | 1.63 | | 10.0 | 6.8 | 6.2 | 5.0 | 7.4 | 8.5 | 8.4 |
| | Substrate | Refractive index | | 1.50 | 1.50 | 1.50 | 1.50 | 1.50 | 1.50 | 1.50 |

TABLE 6

| Layer | Material | Refractive index | | Embodiment 36 | 37 | 38 | 39 | 40 | 41 | 42 | 43 |
|---|---|---|---|---|---|---|---|---|---|---|---|
| Upper-most | Hollow SiO$_2$ | 1.25 | Physical Film | 145.0 | 145.0 | 145.0 | 145.0 | 145.0 | 145.0 | 145.0 | 145.0 |
| 16th | SiO$_2$ | 1.46 | Thickness | | | | | | | | 25.4 |
| 15th | Ta$_2$O$_5$ | 2.30 | (nm) | | | | | | | 5.0 | 5.9 |
| 14th | SiO$_2$ | 1.46 | | | | | | | 5.0 | 34.6 | 67.6 | 82.2 |
| 13th | Ta$_2$O$_5$ | 2.30 | | | | | | | 5.0 | 5.2 | 5.9 | 15.4 |
| 12th | SiO$_2$ | 1.46 | | | | | | 130.1 | 110.5 | 85.4 | 44.0 | 17.3 |
| 11th | Ta$_2$O$_5$ | 2.30 | | | | | 5.8 | 22.2 | 28.6 | 25.7 | 16.5 |
| 10th | SiO$_2$ | 1.46 | | | | 149.4 | 35.5 | 51.2 | 41.2 | 36.6 | 29.5 |
| 9th | Ta$_2$O$_5$ | 2.30 | | | 6.7 | 18.1 | 16.1 | 43.7 | 52.5 | 48.2 | 47.6 |
| 8th | SiO$_2$ | 1.46 | | 156.6 | 124.2 | 62.3 | 53.0 | 27.5 | 15.3 | 15.1 | 11.7 |
| 7th | Ta$_2$O$_5$ | 2.30 | | 17.0 | 20.9 | 34.9 | 34.0 | 62.3 | 87.4 | 77.5 | 180.1 |
| 6th | SiO$_2$ | 1.46 | | 65.5 | 54.5 | 43.0 | 39.0 | 16.1 | 5.0 | 5.0 | 3.8 |
| 5th | Ta$_2$O$_5$ | 2.30 | | 32.9 | 34.1 | 45.4 | 43.9 | 63.2 | 82.6 | 80.6 | 39.3 |
| 4th | SiO$_2$ | 1.46 | | 43.3 | 36.5 | 29.1 | 25.5 | 13.7 | 9.8 | 8.3 | 7.3 |
| 3rd | Ta$_2$O$_5$ | 2.30 | | 40.6 | 41.9 | 41.8 | 38.2 | 30.6 | 56.8 | 54.6 | 42.5 |
| 2nd | SiO$_2$ | 1.46 | | 20.9 | 16.3 | 11.6 | 9.7 | 2.3 | 12.9 | 11.5 | 11.4 |
| 1st | Ta$_2$O$_5$ | 2.30 | | 5.0 | 5.0 | 3.3 | 5.0 | 5.0 | 24.2 | 23.8 | 21.7 |
| | Substrate | | Refractive index | 2.10 | 2.10 | 2.10 | 2.10 | 2.10 | 2.10 | 2.10 | 2.10 |

TABLE 7

| Layer | Material | Refractive index | | Embodiment 44 | 45 | 46 | 47 | 48 | 49 | 50 | 51 |
|---|---|---|---|---|---|---|---|---|---|---|---|
| 13th | Hollow SiO$_2$ | 1.25 | Physical Film | 105.0 | 130.0 | 160.0 | 190.0 | 105.0 | 130.0 | 160.0 | 190.0 |
| 12th | Ta$_2$O$_5$ | 2.30 | Thickness | 3.3 | 6.8 | 6.3 | 6.6 | 3.0 | 5.0 | 5.0 | 5.7 |
| 11th | SiO$_2$ | 1.46 | (nm) | 93.5 | 81.4 | 91.7 | 100.6 | 111.9 | 103.6 | 111.6 | 103.4 |
| 10th | Ta$_2$O$_5$ | 2.30 | | 17.8 | 19.8 | 23.0 | 28.9 | 20.0 | 22.7 | 23.2 | 26.2 |
| 9th | SiO$_2$ | 1.46 | | 39.0 | 34.6 | 36.5 | 41.0 | 45.8 | 43.3 | 46.4 | 44.2 |
| 8th | Ta$_2$O$_5$ | 2.30 | | 35.7 | 35.2 | 40.7 | 57.1 | 41.5 | 44.0 | 46.1 | 47.5 |
| 7th | SiO$_2$ | 1.46 | | 14.6 | 13.0 | 10.4 | 17.7 | 17.8 | 15.3 | 16.4 | 17.8 |
| 6th | Ta$_2$O$_5$ | 2.30 | | 165.1 | 163.6 | 139.9 | 80.3 | 188.9 | 189.1 | 199.9 | 188.5 |
| 5th | SiO$_2$ | 1.46 | | 14.7 | 15.1 | 11.8 | 16.9 | 9.3 | 7.9 | 8.6 | 13.8 |
| 4th | Ta$_2$O$_5$ | 2.30 | | 41.7 | 42.1 | 41.3 | 56.0 | 57.3 | 54.6 | 56.7 | 51.3 |
| 3rd | SiO$_2$ | 1.46 | | 35.0 | 35.5 | 32.2 | 34.4 | 16.7 | 13.8 | 14.2 | 21.6 |
| 2nd | Ta$_2$O$_5$ | 2.30 | | 20.1 | 20.9 | 20.9 | 25.5 | 41.2 | 35.9 | 34.8 | 38.8 |
| 1st | Al$_2$O$_3$ | 1.63 | | 117.1 | 129.1 | 109.0 | 116.2 | 9.7 | 6.0 | 5.0 | 12.1 |
| | Substrate | | Refractive index | 1.50 | 1.50 | 1.50 | 1.50 | 2.10 | 2.10 | 2.10 | 2.10 |

TABLE 8

| Layer | Material | Refractive index | | Embodiment 52 | 53 | 54 | 55 | 56 | 57 |
|---|---|---|---|---|---|---|---|---|---|
| 13th | Hollow SiO$_2$ | 1.25 | Physical Film | 105.0 | 130.0 | 160.0 | 105.0 | 130.0 | 160.0 |
| 12th | SiO$_2$ | 1.46 | Thickness | 130.1 | 145.5 | 154.9 | 119.8 | 119.8 | 132.2 |
| 11th | Ta$_2$O$_5$ | 2.30 | (nm) | 16.7 | 16.1 | 17.9 | 6.7 | 11.7 | 7.6 |
| 10th | SiO$_2$ | 1.46 | | 56.9 | 66.7 | 68.6 | 28.0 | 51.4 | 23.9 |
| 9th | Ta$_2$O$_5$ | 2.30 | | 35.6 | 29.2 | 31.5 | 15.7 | 28.7 | 15.9 |
| 8th | SiO$_2$ | 1.46 | | 41.8 | 57.3 | 59.9 | 43.0 | 36.7 | 47.1 |
| 7th | Ta$_2$O$_5$ | 2.30 | | 45.5 | 32.0 | 31.9 | 38.8 | 49.7 | 39.6 |
| 6th | SiO$_2$ | 1.46 | | 43.3 | 62.0 | 67.3 | 27.5 | 21.0 | 31.4 |
| 5th | Ta$_2$O$_5$ | 2.30 | | 38.3 | 24.8 | 22.5 | 59.4 | 67.1 | 55.4 |
| 4th | SiO$_2$ | 1.46 | | 59.2 | 75.5 | 82.3 | 15.7 | 13.3 | 18.3 |
| 3rd | Ta$_2$O$_5$ | 2.30 | | 22.9 | 14.6 | 12.0 | 65.3 | 65.1 | 57.8 |
| 2nd | SiO$_2$ | 1.46 | | 75.9 | 82.7 | 84.3 | 13.4 | 13.0 | 13.3 |
| 1st | Ta$_2$O$_5$ | 2.30 | | 8.6 | 5.0 | 3.3 | 33.1 | 33.1 | 26.0 |
| | Substrate | | Refractive index | 1.50 | 1.50 | 1.50 | 2.10 | 2.10 | 2.10 |

TABLE 9

| Layer | Material | Refractive index | | Embodiment 58 | 59 | 60 | 61 |
|---|---|---|---|---|---|---|---|
| 13th | Hollow SiO$_2$ | | Refractive index | 1.10 | 1.29 | 1.10 | 1.29 |
| | | | Film Thickness (nm) | 172.8 | 151.0 | 175.9 | 157.6 |
| 12th | Ta$_2$O$_5$ | 2.30 | Physical | 5.0 | 12.0 | 2.5 | 10.7 |
| 11th | SiO$_2$ | 1.46 | Film | 113.2 | 66.3 | 132.3 | 80.8 |
| 10th | Ta$_2$O$_5$ | 2.30 | Thickness | 21.2 | 23.7 | 20.1 | 28.1 |
| 9th | SiO$_2$ | 1.46 | (nm) | 43.9 | 24.6 | 51.5 | 36.1 |
| 8th | Ta$_2$O$_5$ | 2.30 | | 40.5 | 31.1 | 42.8 | 47.0 |
| 7th | SiO$_2$ | 1.46 | | 12.0 | 10.4 | 18.7 | 11.8 |
| 6th | Ta$_2$O$_5$ | 2.30 | | 148.9 | 168.7 | 194.2 | 181.9 |
| 5th | SiO$_2$ | 1.46 | | 13.5 | 17.2 | 8.3 | 7.0 |
| 4th | Ta$_2$O$_5$ | 2.30 | | 43.6 | 43.2 | 60.0 | 52.1 |
| 3rd | SiO$_2$ | 1.46 | | 35.8 | 38.2 | 15.9 | 14.1 |
| 2nd | Ta$_2$O$_5$ | 2.30 | | 21.7 | 20.3 | 41.1 | 40.1 |
| 1st | Al$_2$O$_3$ | 1.63 | | 126.0 | 123.8 | 10.0 | 9.8 |
| | Substrate | | Refractive index | 1.50 | 1.50 | 2.10 | 2.10 |

TABLE 10

| Layer | Material | Refractive index | | Embodiment 62 | 63 | 64 |
|---|---|---|---|---|---|---|
| 13th | Hollow SiO$_2$ | | Refractive index | 1.29 | 1.10 | 1.29 |
| | | | Film Thickness (nm) | 148.0 | 155.5 | 143.7 |
| 12th | SiO$_2$ | 1.46 | Physical | 151.5 | 130.0 | 128.3 |
| 11th | Ta$_2$O$_5$ | 2.30 | Film | 5.0 | 4.5 | 5.5 |
| 10th | SiO$_2$ | 1.46 | Thickness | 25.4 | 57.8 | 47.2 |
| 9th | Ta$_2$O$_5$ | 2.30 | (nm) | 8.4 | 13.9 | 16.1 |
| 8th | SiO$_2$ | 1.46 | | 75.0 | 56.3 | 57.1 |
| 7th | Ta$_2$O$_5$ | 2.30 | | 18.6 | 31.7 | 31.9 |
| 6th | SiO$_2$ | 1.46 | | 80.0 | 42.9 | 43.1 |
| 5th | Ta$_2$O$_5$ | 2.30 | | 17.3 | 42.8 | 42.5 |
| 4th | SiO$_2$ | 1.46 | | 86.2 | 28.9 | 28.4 |
| 3rd | Ta$_2$O$_5$ | 2.30 | | 11.3 | 41.2 | 39.5 |
| 2nd | SiO$_2$ | 1.46 | | 85.3 | 12.8 | 11.7 |
| 1st | Ta$_2$O$_5$ | 2.30 | | 4.0 | 5.0 | 5.0 |
| | Substrate | | Refractive index | 1.50 | 2.10 | 2.10 |

Embodiment 65

Figure 18:
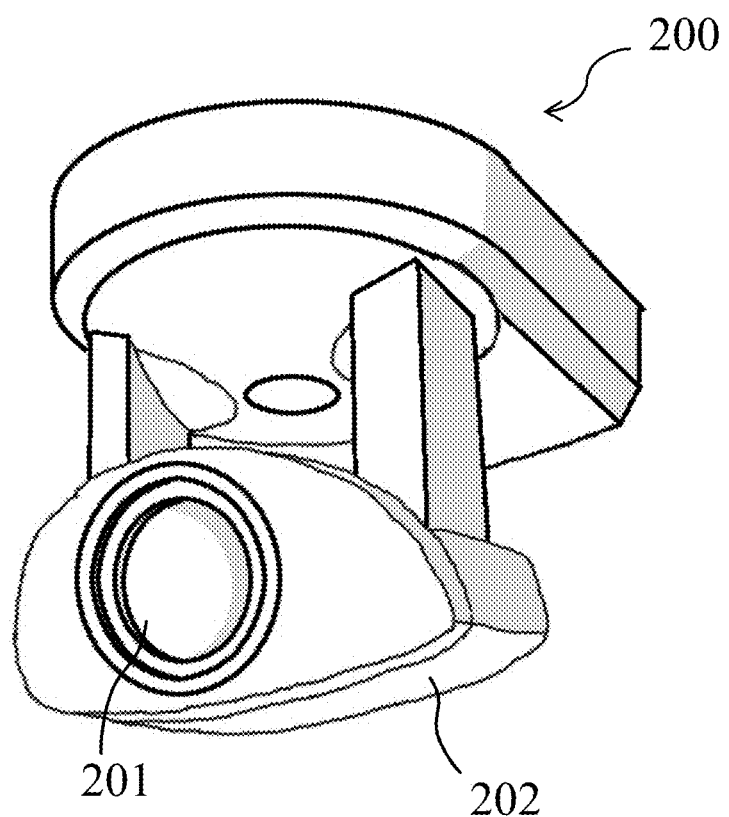
FIG. 18 is a perspective view of an optical apparatus that is Embodiment 65.

FIG. 18 illustrates a surveillance network camera 200 as an optical apparatus that is Embodiment 65 of the present invention. The camera 200 includes an image capturing optical system 201 that forms an optical image of an object and a main body (holder) 202 that holds the image capturing optical system 201. The image capturing optical system 201 is constituted by multiple lenses.

On a surface of at least one lens (optical element) among these lenses, the antireflection coating 10 of any one of Embodiments 1 to 64 is formed.

Forming the antireflection coating on the lens enables the camera 200 not only to produce an image in which a generation of unwanted light such as flare and ghost is reduced, but also to increase an amount of transmitted light so as to obtain more image information, which achieves a high performance camera.

Although this embodiment described the network camera as an example of optical apparatuses, the antireflection coatings of Embodiments 1 to 64 can be formed on an optical element included in various optical apparatuses other than the network camera, such as image capturing apparatuses and interchangeable lenses.

Each of the above-described embodiments can provide an antireflection coating having a high antireflection performance in a wide wavelength range from 430 nm to 1800 nm in which visible light and airglow can be used. Furthermore, using an optical element provided with this antireflection coating enables achieving an optical system and an optical apparatus each having a high optical performance.

Although this embodiment described the camera as an example of optical apparatuses, the optical apparatuses include an interchangeable lens that includes an image capturing optical system (including an optical element on which the antireflection coating of any one of Embodiments 1 to 64 is formed) and a lens barrel as a holding member holding the image capturing optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-204574, filed on Oct. 16, 2015, which is hereby incorporated by reference herein in its entirety.

What is claimed is:

1. An antireflection coating as a multi-layer film to be formed on a surface of a substrate, the antireflection coating comprising:
multiple layers including:
an uppermost layer most distant from the substrate among the multiple layers; and
a lower layer including at least one layer other than the uppermost layer,
wherein:
a refractive index $n_m$ of the uppermost layer for a wavelength of $\lambda$ (nm) satisfies the following condition:

$$1.1 \leq n_m \leq 1.3; \text{ and}$$

an optical admittance Y of the lower layer is expressed by Y=a+ib, and a and b in the optical admittance satisfy the following conditions:

$$(a-1.13)^2+(b-0.24)^2 \leq 0.45^2 \text{ for } \lambda=430;$$

$$(a-1.33)^2+(b+0.05)^2 \leq 0.25^2 \text{ for } \lambda=900; \text{ and}$$

$$(a-1.14)^2+(b+0.25)^2 \leq 0.29^2 \text{ for } \lambda=1800; \text{ and}$$

wherein:
when an incident angle of a ray, whose wavelength λ (nm) is in a range of 430≤λ≤1800, to the antireflection coating is 0° or more and 15° or less, a reflectance of the antireflection coating is 1.5% or less; and
when the incident angle of the ray is 30° or more and 45° or less, the reflectance of the antireflection coating is 4.5% or less.

2. The antireflection coating according to claim 1, wherein a and b in the optical admittance satisfy the following conditions:

$$(a-1.10)^2+(b-0.22)^2\le 0.26^2 \text{ for } \lambda=430;$$

$$(a-1.33)^2+(b+0.05)^2\le 0.20^2 \text{ for } \lambda=900; \text{ and}$$

$$(a-1.18)^2+(b+0.26)^2\le 0.25^2 \text{ for } \lambda=1800.$$

3. The antireflection coating according to claim 1, wherein a and b in the optical admittance satisfy at least one of the following conditions in a wavelength range of 430≤λ≤1800:

$$(a-1.09)^2+(b-0.20)^2\le 0.35^2;$$

$$(a-1.28)^2+b^2\le 0.35^2; \text{ and}$$

$$(a-1.27)^2+(b+0.28)^2\le 0.35^2.$$

4. The antireflection coating according to claim 1, wherein a film thickness $d_m$ (nm) of the uppermost layer satisfies the following condition:

$$125\le n_m\times d_m\le 250.$$

5. The antireflection coating according to claim 1, wherein the multiple layers includes nine or more layers.

6. The antireflection coating according to claim 1, wherein when, among materials of two or more layers of the lower layer, a highest refractive index material has a refractive index represented by $n_H$, and a lowest refractive index material has a refractive index represented by $n_L$, $n_H$ and $n_L$ satisfy the following condition:

$$0.4\le n_H-n_L\le 0.9.$$

7. The antireflection coating according to claim 1, wherein the uppermost layer is formed as a layer including a void.

8. The antireflection coating according to claim 1, wherein a material of the uppermost layer is oxide silicon or magnesium fluoride.

9. The antireflection coating according to claim 1, wherein the uppermost layer is a film formed by a sol-gel method.

10. The antireflection coating according to claim 1, wherein the lower layer is a film formed by a vacuum evaporation method or a sputtering method.

11. The antireflection coating according to claim 1, wherein a material of the lower layer is any one of oxides of titanium, tantalum, zirconia, chromium, niobium, cerium, hafnium, aluminium, silicon and yttrium, or a mixture thereof.

12. An optical element comprising:
an optical element body as a substrate; and
an antireflection coating as a multi-layer film formed on a surface of the optical element body,
wherein the antireflection coating comprises:
multiple layers including:
an uppermost layer most distant from the substrate among the multiple layers; and
a lower layer including at least one layer other than the uppermost layer,
wherein:
a refractive index $n_m$ of the uppermost layer for a wavelength of λ (nm) satisfies the following condition:

$$1.1\le n_m\le 1.3; \text{ and}$$

an optical admittance Y of the lower layer is expressed by Y=a+ib, and a and b in the optical admittance satisfy the following conditions:

$$(a-1.13)^2+(b-0.24)^2\le 1.45^2 \text{ for } \lambda=430;$$

$$(a-1.33)^2+(b+0.05)^2\le 1.25^2 \text{ for } \lambda=900; \text{ and}$$

$$(a-1.14)^2+(b+0.25)^2\le 1.29^2 \text{ for } \lambda=1800; \text{ and}$$

wherein:
when an incident angle of a ray, whose wavelength λ (nm) is in a range of 430≤λ≤1800, to the antireflection coating is 0° or more and 15° or less, a reflectance of the antireflection coating is 1.5% or less; and
when the incident angle of the ray is 30° or more and 45° or less, the reflectance of the antireflection coating is 4.5% or less.

13. An optical apparatus comprising:
an optical element; and
a holder holding the optical element,
wherein the optical element comprises:
an optical element body as a substrate; and
an antireflection coating as a multi-layer film formed on a surface of the optical element body,
wherein the antireflection coating comprises:
multiple layers including:
an uppermost layer most distant from the substrate among the multiple layers; and
a lower layer including at least one layer other than the uppermost layer,
wherein:
a refractive index $n_m$ of the uppermost layer for a wavelength of λ (nm) satisfies the following condition:

$$1.1\le n_m\le 1.3; \text{ and}$$

an optical admittance Y of the lower layer is expressed by Y=a+ib, and a and b in the optical admittance satisfy the following conditions:

$$(a-1.13)^2+(b-0.24)^2\le 1.45^2 \text{ for } \lambda=430;$$

$$(a-1.33)^2+(b+0.05)^2\le 1.25^2 \text{ for } \lambda=900; \text{ and}$$

$$(a-1.14)^2+(b+0.25)^2\le 1.29^2 \text{ for } \lambda=1800; \text{ and}$$

wherein:
when an incident angle of a ray, whose wavelength λ (nm) is in a range of 430≤λ≤1800, to the antireflection coating is 0° or more and 15° or less, a reflectance of the antireflection coating is 1.5% or less; and
when the incident angle of the ray is 30° or more and 45° or less, the reflectance of the antireflection coating is 4.5% or less.

* * * * *